US011796204B2

(12) United States Patent
Heintzelman et al.

(10) Patent No.: US 11,796,204 B2
(45) Date of Patent: Oct. 24, 2023

(54) DETERMINING AN IRREGULARITY IN CONNECTIONS FOR AN HVAC CONTROLLER BASED ON GEOGRAPHIC LOCATION

(71) Applicant: Ademco Inc., Golden Valley, MN (US)

(72) Inventors: Christopher Heintzelman, Plymouth, MN (US); Joseph C. Vargas, Elk River, MN (US)

(73) Assignee: Ademco Inc., Golden Valley, MN (US)

( * ) Notice: Subject to any disclaimer, the term of this patent is extended or adjusted under 35 U.S.C. 154(b) by 62 days.

(21) Appl. No.: 16/593,871

(22) Filed: Oct. 4, 2019

(65) Prior Publication Data

US 2021/0102723 A1 Apr. 8, 2021

(51) Int. Cl.
*F24F 11/63* (2018.01)
*G06F 16/245* (2019.01)
(Continued)

(52) U.S. Cl.
CPC .............. *F24F 11/63* (2018.01); *F24F 11/32* (2018.01); *G06F 16/245* (2019.01); *G06F 16/29* (2019.01)

(58) Field of Classification Search
CPC .. F24F 11/58; F24F 11/30; F24F 11/52; F24F 11/64; F24F 2221/32; F24F 11/49; F24F 11/50; F24F 11/63; F24F 11/32; Y04S 40/18; G05B 15/02; G05B 2219/2614; G05B 2219/2642; G05B 2219/25056; G05B 2219/25168; G06F 16/245; G06F 16/29
See application file for complete search history.

(56) References Cited

U.S. PATENT DOCUMENTS 7,451,606 B2 * 11/2008 Harrod ..................... F24F 11/88
702/183
8,523,083 B2 9/2013 Warren et al.
(Continued)

FOREIGN PATENT DOCUMENTS

WO 2007130051 A1 11/2007

OTHER PUBLICATIONS

Honeywell Home, "T9 Thermostat Installation Guide," guides available from honeywellhome.com, Nov. 2008, 32 pp.
(Continued)

*Primary Examiner* — Darrin D Dunn
(74) *Attorney, Agent, or Firm* — Greenberg Traurig, LLP; Ryan D. Sharp; David J. Dykeman

(57) ABSTRACT

In some examples, a device can control an HVAC system within a building. The device includes a memory configured to store an actual configuration of the HVAC system and processing circuitry operably coupled to the memory. The processing circuitry is configured to determine which field wires connect a terminal to the HVAC system. The processing circuitry is further configured to determine an actual configuration of the HVAC system based on which field wires connect the terminal to the HVAC system and determine a geographic location of the HVAC controller or of the device. The processing circuitry is configured to determine that the actual configuration includes an irregularity based on the determined geographic location and generate an output in response to determining that the actual configuration includes an irregularity.

20 Claims, 12 Drawing Sheets

(51) Int. Cl.
*G06F 16/29* (2019.01)
*F24F 11/32* (2018.01)

(56) References Cited

U.S. PATENT DOCUMENTS

| | | | | |
|---|---|---|---|---|
| 8,944,338 | B2* | 2/2015 | Warren | F24F 11/66 |
| | | | | 439/828 |
| 9,092,039 | B2 | 7/2015 | Fadell et al. | |
| 9,488,994 | B2* | 11/2016 | Zywicki | F24F 11/65 |
| 9,575,496 | B2 | 2/2017 | Fadell et al. | |
| 9,684,317 | B2 | 6/2017 | Fadell et al. | |
| 9,885,492 | B2 | 2/2018 | Thiruvengada et al. | |
| 10,208,972 | B2 | 2/2019 | Novotny et al. | |
| 2002/0107878 | A1* | 8/2002 | Tsuchida | G06F 11/2094 |
| 2007/0157639 | A1* | 7/2007 | Harrod | F24F 11/30 |
| | | | | 62/129 |
| 2007/0221741 | A1* | 9/2007 | Wagner | F24F 11/30 |
| | | | | 236/94 |
| 2009/0101725 | A1 | 4/2009 | Dolan et al. | |
| 2010/0114382 | A1* | 5/2010 | Ha | F24F 11/62 |
| | | | | 700/276 |
| 2010/0314458 | A1* | 12/2010 | Votaw | F24F 3/001 |
| | | | | 236/1 B |
| 2012/0126021 | A1* | 5/2012 | Warren | B01D 46/0086 |
| | | | | 236/1 C |
| 2015/0037992 | A1* | 2/2015 | Perez, Jr. | H01R 9/2475 |
| | | | | 439/217 |
| 2016/0182528 | A1* | 6/2016 | Entezari | G06F 21/606 |
| | | | | 726/30 |
| 2016/0209062 | A1* | 7/2016 | Castillo | H04L 12/283 |
| 2016/0357782 | A1* | 12/2016 | Jones | G06F 16/29 |
| 2018/0017274 | A1* | 1/2018 | Erdman | F24F 11/62 |
| 2018/0109906 | A1* | 4/2018 | Sentz | H04W 4/38 |
| 2018/0231268 | A1* | 8/2018 | Combe | F24F 11/58 |
| 2019/0158353 | A1* | 5/2019 | Johnson | H04L 67/34 |
| 2020/0217540 | A1* | 7/2020 | Fan | F24F 11/62 |
| 2020/0224905 | A1* | 7/2020 | Notaro | F24F 11/30 |

OTHER PUBLICATIONS

"Thermostat Terminal Designations Explanations," HVAC Heating & Cooling, accessed from https://highperformancehvac.com/thermostat-terminal-designations/ on or about Apr. 25, 2019, 3 pp.

U.S. Appl. No. 16/157,000, filed Oct. 10, 2018, naming inventors Barton et al.

U.S. Appl. No. 16/422,748, filed May 24, 2019, naming inventors Jones et al.

* cited by examiner

DETERMINING AN IRREGULARITY IN CONNECTIONS FOR AN HVAC CONTROLLER BASED ON GEOGRAPHIC LOCATION

TECHNICAL FIELD

The disclosure relates to heating, ventilation, and air condition (HVAC) systems and thermostats for buildings.

BACKGROUND

A heating, ventilation, and air conditioning (HVAC) controller can control a variety of devices such as a furnace, a heat pump including a geothermal heat pump, a boiler, air conditioning unit, forced air circulation, and other similar equipment to control the internal climate conditions of a building. In some examples, a thermostat can control different devices depending on the outside temperature, temperature inside the building, the time of day, and other factors.

SUMMARY

In general, this disclosure describes an HVAC controller that can determine whether a wiring configuration for the HVAC controller is anomalous based on geographic location. The HVAC controller may include a terminal for connecting field wires extending between the HVAC controller and an HVAC system, or the HVAC controller may be a computing device in communication with a thermostat that includes the terminal. The HVAC controller can detect which field wires are connected to the HVAC controller and determine settings for the HVAC system based on which wires are connected. The HVAC controller is configured to determine whether the determined settings are anomalous based on a geographic location of the HVAC controller.

In some examples, a device can control an HVAC system within a building. The device includes a memory configured to store an actual configuration of the HVAC system and processing circuitry operably coupled to the memory. The processing circuitry is configured to determine which field wires connect a terminal to the HVAC system. The processing circuitry is further configured to determine an actual configuration of the HVAC system based on which field wires connect the terminal to the HVAC system and determine a geographic location of the HVAC controller or of the device. The processing circuitry is configured to determine that the actual configuration includes an irregularity based on the determined geographic location and generate an output in response to determining that the actual configuration includes an irregularity.

In some examples, a method for controlling an HVAC system within a building includes determining, by processing circuitry of a device, which field wires connect a terminal on an HVAC controller to the HVAC system. The method includes determining, by the processing circuitry, an actual configuration of the HVAC system based on which field wires connect the terminal to the HVAC system. The method further includes determining, by the processing circuitry, a geographic location of the HVAC controller or of the device and determining, by the processing circuitry, that the actual configuration includes an irregularity based on the determined geographic location. The method includes generating, by the processing circuitry, an output in response to determining that the actual configuration includes the irregularity.

In some examples, a system includes memory configured to store expected configurations of heating, ventilation, and air conditioning (HVAC) systems, wherein each expected configuration is associated with a geographic location of a plurality of geographic locations. The system also includes processing circuitry configured to receive, from an HVAC controller, a query including a first geographic location and communicate a first expected configuration associated with the first geographic location to the HVAC controller.

The details of one or more examples of the disclosure are set forth in the accompanying drawings and the description below. Other features, objects, and advantages of the disclosure will be apparent from the description and drawings, and from the claims.

DETAILED DESCRIPTION

Figure 1:
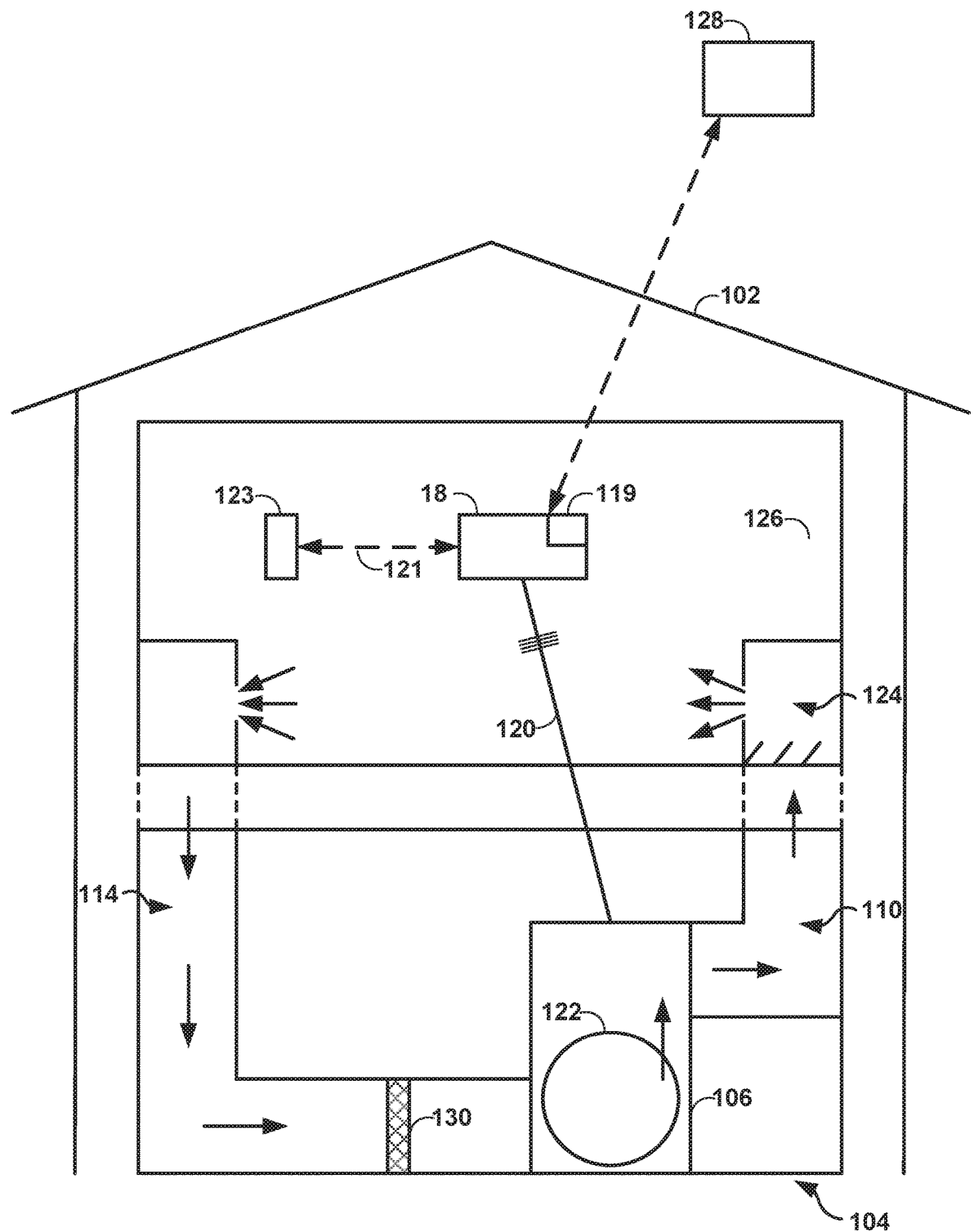
FIG. 1 is a block diagram illustrating an example heating, ventilation, and air conditioning (HVAC) system in a building.

FIG. 1 is a block diagram illustrating an example heating, ventilation, and air conditioning (HVAC) system 104 in a building 102. HVAC system 104 includes HVAC component 106, a system of ductwork and air vents including supply air duct 110 and a return air duct 114, and controller 18. HVAC component 106 may include, but is not limited to, a furnace, a heat pump, an electric heat pump, a geothermal heat pump, an electric heating unit, an air conditioning (AC) unit, a humidifier, a dehumidifier, an air exchanger, an air cleaner, a damper, a valve, a fan, and/or the like.

Controller 18 may be configured to control the comfort level (e.g., temperature and/or humidity) in building 102 by activating and deactivating HVAC component 106 in a controlled manner. Controller 18 may be configured to control HVAC component 106 via a wired or wireless communication link 120. In an example wired communication link 120 to HVAC component 106, controller 18 may connect to a plurality of wires (e.g., see FIGS. 2A-2D). Controller 18 may be a thermostat, such as, for example, a wall mountable thermostat. In some examples, controller 18 may be programmable to allow for user-defined temperature set points to control the temperature of building 102. Based on sensed temperature of building 102, controller 18 may turn on or off HVAC component 106 to reach the user-defined temperature set point. Although this disclosure describes controller 18 (and controllers shown in other figures) as controlling HVAC component 106 and determining whether an actual configuration includes an irregularity, external computing device 123 may also be configured to perform these functions.

HVAC component 106 may provide heated air (and/or cooled air) via the ductwork throughout the building 102. As illustrated, HVAC component 106 may be in fluid communication with every space, room, and/or zone in building 102 via ductwork 110 and 114, but this is not required. In operation, when controller 18 provides a heat call signal, HVAC component 106 (e.g. a forced warm air furnace) may turn on (begin operating or activate) to supply heated air to one or more spaces within building 102 via supply air ducts 110. HVAC component 106 and blower or fan 122 can force the heated air through supply air duct 110. In this example, cooler air from each space returns to HVAC component 106 (e.g. forced warm air furnace) for heating via return air ducts 114. Similarly, when a cool call signal is provided by controller 18, HVAC component 106 (e.g., an AC unit) may turn on to supply cooled air to one or more spaces within building 102 via supply air ducts 110. HVAC component 106 and blower or fan 122 can force the cooled air through supply air duct 110. In this example, warmer air from each space of building 102 may return to HVAC component 106 for cooling via return air ducts 114.

The system of vents or ductwork 110 and/or 114 can include one or more dampers 124 to regulate the flow of air, but this is not required. For example, one or more dampers 124 may be coupled to controller 18, and can be coordinated with the operation of HVAC component 106. Controller 18 may actuate dampers 124 to an open position, a closed position, and/or a partially open position to modulate the flow of air from the one or more HVAC components to an appropriate room and/or space in building 102. Dampers 124 may be particularly useful in zoned HVAC systems, and may be used to control which space(s) in building 102 receive conditioned air and/or receives how much conditioned air from HVAC component 106.

In many instances, air filters 130 may be used to remove dust and other pollutants from the air inside building 102. In the example shown in FIG. 1, air filter 130 is installed in return air duct 114 and may filter the air prior to the air entering HVAC component 106, but it is contemplated that any other suitable location for air filter 130 may be used. The presence of air filter 130 may not only improve the indoor air quality but may also protect the HVAC component 106 from dust and other particulate matter that would otherwise be permitted to enter HVAC component 106.

Controller 18 may include any suitable arrangement of hardware, software, firmware, or any combination thereof, to perform the techniques attributed to controller 18 herein. Examples of controller 18 include any one or more microprocessors, digital signal processors (DSPs), application specific integrated circuits (ASICs), field programmable gate arrays (FPGAs), or any other equivalent integrated or discrete logic circuitry, as well as any combinations of such components. When controller 18 includes software or firmware, controller 18 further includes any necessary hardware for storing and executing the software or firmware, such as one or more processors or processing units. In general, a processing unit may include one or more microprocessors, DSPs, ASICs, FPGAs, or any other equivalent integrated or discrete logic circuitry, as well as any combinations of such components.

Although not shown in FIG. 1, controller 18 may include a memory configured to store data. The memory may include any volatile or non-volatile media, such as a random access memory (RAM), read only memory (ROM), non-volatile RAM (NVRAM), electrically erasable programmable ROM (EEPROM), flash memory, and the like. In some examples, the memory may be external to controller 18 (e.g., may be external to a package in which controller 18 is housed). For example, controller 18 may be able to store data to and read data from the memory included in external computing device 123 and/or the memory included in external database 128. The memory may be used for storing data such as possible wiring configurations of controller 18 and network settings such as an Internet Protocol (IP) address and/or a Media Access Control (MAC) address of controller 18, external computing device 123, and/or a router.

Controller 18 may include any number of wire terminals which make up a terminal block (e.g., a wall plate or a terminal plate) for receiving a plurality of control wires for one or more HVAC components 106 of HVAC system 104. The memory may store possible wiring configurations for HVAC components 106, enabling controller 18 to determine what HVAC components 106 are connected. Example details of storing and determining possible wiring configurations for configuring a controller can be found in commonly assigned U.S. Pat. No. 9,885,492, filed on Nov. 22, 2013, entitled "Methods Systems and Tools for Determining a Wiring Configuration for an HVAC Controller," the entire contents of which are incorporated herein. The memory of controller 18 may also store settings for HVAC system 104 which correspond to the possible wirings configurations for HVAC components 106. For example, if controller 18 is wired to HVAC component 106 which includes an AC unit, controller 18 may determine settings to allow for cool call signals to control turning on and off of the AC unit.

In some examples, controller 18 may also include a memory for storing data about how previous controllers 18 have been configured. For example, the memory may store an expected wiring configuration associated with a certain geographic location. In some examples, the memory may store program instructions, which may include one or more program modules, which are executable by controller 18. When executed by controller 18, such program instructions may cause controller 18 to provide the functionality ascribed to it herein. The program instructions may be embodied in software, firmware, and/or RAMware.

Controller 18 may include a user interface, which may permit controller 18 to display information and/or accept one or more user inputs to controller 18. For example, the user interface may permit a user to input various operating parameters (e.g., temperature set points, humidity set points, fan set points, starting times, ending times, schedule times, diagnostic limits, configuration settings, responses to alerts, and the like) to controller 18. In some examples, the display may be a physical user interface that is accessible at controller 18 and may include a display and/or a distinct keypad. The display may be any suitable display. In some examples, the display may include, or may be, a liquid crystal display (LCD), and in some cases an e-ink display, fixed segment display, or a dot matrix LCD display. The distinct keypad may include a numerical keypad, system of buttons, control knob, and the like. Additionally or alternatively, controller 18 can display information and/or accept user inputs via the user interface of external computing device 123. Thus, a user can interact with controller 18 through a mobile phone, a tablet, or a computer.

In some examples, the display may include a presence sensitive device to detect user inputs to controller 18. Example presence-sensitive input displays include a resistive touchscreen, a surface acoustic wave touchscreen, a capacitive touchscreen, a projective capacitance touchscreen, a pressure sensitive screen, an acoustic pulse recognition touchscreen, or another presence-sensitive display technology. The display of controller 18 may function as an output device using any one or more display devices, such as a liquid crystal display (LCD), dot matrix display, light emitting diode (LED) display, organic light-emitting diode (OLED) display, e-ink, or similar monochrome or color display capable of outputting visible information to a user. The user interface presented by the display of controller 18 may allow a user to program settings of controller 18, set temperature zones for building 102, configure desired temperatures for building 102 for different times of the day or days of the week, or other operating parameters. The display of controller 18 may also be used to present user queries (e.g., what room controller 18 is installed in, what the address of building 102 is, what HVAC components 106 are connected to controller 18, etc.). Such queries may aid in installing and/or configuring controller 18 (e.g. when first connecting controller 18 to HVAC component 106 of HVAC system 104).

Controller 18 may include a communication device 119 to allow controller 18 to communicate via a wired or wireless connection 121 to one or more external computing devices 123. Communication device 119 may include a Bluetooth transmitter and receiver, a Wi-Fi transmitter and receiver, a Zigbee transceiver, a near-field communication transceiver, or other circuitry configured to allow controller 18 to communicate with external computing device 123. In some examples, communication device 119 may allow controller 18 to exchange data with external computing device 123. Examples of exchanged data include a desired temperature for building 102, HVAC components 106 connected to controller 18, error codes, geographic location, estimated energy usage and cost, and/or other operating parameters or system performance characteristics for HVAC system 104.

Controller 18 may communicate via wired or wireless connection 121 with external computing device 123. External computing device 123 may be, include, or otherwise be used in combination with a mobile phone, smartphone, tablet computer, personal computer, desktop computer, personal digital assistant, router, modem, remote server or cloud computing device, and/or related device allowing controller 18 to communicate over a communication network such as, for example, the Internet or other wired or wireless connection. Communicating via the wired or wireless connection 121 may allow controller 18 to be configured, controlled, or otherwise exchange data with external computing device 123. In some examples, controller 18 communicating via wired or wireless connection 121 may allow a user to set up controller 18 when first installing the controller in building 102. In some examples, controller 18 and external computing device 123 communicate through a wireless network device such as a router or a switch. In other examples, controller 18 and external computing device 123 communicate through a wired connection such as an ethernet port, USB connection, or other wired communication network.

As discussed previously, controller 18 may activate and deactivate HVAC system 104 to control the comfort level of building 102. Depending on the one or more HVAC components 106 included, controller 18 may configure various settings and other operating parameters for operating HVAC system 104. Controller 18 may determine settings for operating HVAC system 104 in multiple ways. In some examples, controller 18 may detect a plurality of wires connected to a field wire connection terminal block of controller 18 (e.g., a "terminal" of controller 18). Controller 18 may then determine settings for operating the one or more HVAC components 106 included in HVAC system 104. For example, controller 18 may detect that only wires for an air conditioner are connected to the field wire connection terminal block. In response, controller 18 may configure settings which only allow for cool call signals for building 102. In some examples, controller 18 may determine settings for operating HVAC system 104 based on responses to user queries presented via the included display (e.g., what type of heating system is used, whether an air conditioning unit is connected, etc.). In response, controller 18 may configure settings which correspond to the responses to the user queries (e.g., what type of HVAC components 106 are included in HVAC system 104). For example, controller 18 may ask the user, "Do you have electric heat, gas or oil heat, or no heat?" If the user answers the query with "no heat," controller 18 may configure settings which only allow for cool call signals for building 102. Detecting the plurality of wires connected to controller 18 or querying the user for responses regrading HVAC system 104, and in response configuring settings for HVAC system 104 may reduce the complexity of installing controller 18 by reducing the amount of information a user must know when first setting up the system.

While controller 18 may determine what HVAC components 106 are included in HVAC system 104, without verifying the determined HVAC components correspond with the actual HVAC system of building 102, installation of controller 18 is susceptible to user error. For example, a user may incorrectly connect one or more of the wires to the field wire connection terminal block of controller 18. In such examples, controller 18 may configure operation settings for the detected (e.g., incorrect) system rather than the actual HVAC system 104. For instance, a user might install controller 18 in Minneapolis, Minn. where temperatures frequently drop below zero Fahrenheit, without properly connecting a furnace or other heating HVAC component. In such an example, controller 18 may determine settings for HVAC system 104 which correspond to an air conditioner only system. During colder months, when temperatures begin to drop, controller 18 may not produce any heat call signals for HVAC system 104, meaning that building 102 may not receive any heated air.

In another example, a user may incorrectly respond to the queries presented by controller 18. In such examples, controller 18 may configure operation settings for an incorrect system rather than the actual HVAC system 104. As demonstrated by these two examples, in response to incorrect user installation, controller 18 may improperly operate HVAC system 104. Improper operation of HVAC system 104 may result in uncomfortable climate control conditions in building 102. This may reduce customer satisfaction and/or require the user to contact an installation professional to correct the installation. Reducing the complexity of installation may allow an unskilled user to install controller 18 without the aid or expertise of a professional and increase customer satisfaction.

In accordance with the techniques of this disclosure, controller 18 and/or external computing device 123 can determine whether the actual configuration of HVAC system 104 includes an irregularity based on geographic location. Controller 18 can determine the geographic location of building 102, or the geographic location of controller 18 or external computing device 123, and the actual wiring configuration of controller 18. Controller 18 can then compare the actual wiring configuration to an expected wiring configuration to determine whether the user has correctly wired controller 18. Controller 18 can generate an output in response to determining that the actual configuration of the controller includes an irregularity (e.g., there is a difference between the actual configuration and the expected configuration of the associated geographic location). For example, if a controller in Minneapolis, Minn. configures settings for operating HVAC system 104 as a cool-only system, controller 18 may generate an output in response to determining that the actual configuration of controller 18 is irregular because a cool-only system is atypical for a cold climate like Minnesota.

Controller 18 may determine the actual configuration includes an irregularity or is atypical by determining there is a difference between the actual configuration and an expected configuration. The expected configuration may include a single HVAC system 104 configuration (e.g., air conditioner and a dual stage furnace with a humidifier), or may include a range of possible HVAC systems 104 typical of a geographic location (e.g., air conditioner and a heating HVAC component with a humidifier). In some examples, controller 18 may determine the actual configuration is irregular based on any difference between the actual configuration and the expected configuration. In examples when there is a difference between the actual and expected configurations, controller 18 may determine a severity or importance of the difference, such as whether the difference is an error or merely an atypical configuration for the geographic location. For example, a two-stage furnace in a home in Texas may be irregular but not necessarily an error because Texas can get very cold, whereas connecting no heating HVAC component in Michigan is an obvious error because Michigan winters are very cold.

Controller 18 may generate an output to the user depending on the severity of the difference. In some examples, controller 18 may determine the actual configuration is substantially similar to the expected configuration, and within a reasonable configuration. In such examples, there may be a substantial and important difference between the actual configuration and the expected configuration, and controller 18 may determine there is an irregularity. In examples in which controller 18 determines an irregularity, controller 18 may output an alert to the user. However, controller 18 may determine the irregularity is reasonable, but still generate an output to notify the user of this difference. For example, if the expected configuration includes a two-stage furnace, but the actual configuration of controller 18 includes a heat pump and single-stage furnace, controller 18 may determine the actual configuration is atypical and generate an output merely to alert the user to this difference.

Controller 18 may determine the geographic location of controller 18 based on where building 102 is located. Controller 18 may store the geographic location in the onboard memory of controller 18 or in external memory of computing device 123 as a postal code (e.g., zip code), street address, latitude and longitude coordinates, city or town, state or province, telephone code (e.g., area code), elevation, topographic region, and/or climate region. The memory of controller 18 may also store the expected wiring configuration as part of a database or data structure (e.g., array) stored in the memory of controller 18. In some examples, controller 18 is configured to query an external database 128 (e.g., a cloud database) for the expected wiring configuration associated with the determined geographic location.

Controller 18 may, via communication device 119, communicate via a wired or wireless connection 126 with external database 128. In some examples, wired or wireless connection 126 enables controller 18 to communicate with external database 128 via a wireless connection which includes a network device such as a router, ethernet port, or switch. Controller 18 and external database 128 may also communicate through a wired connection such as an ethernet port, USB connection, or other wired communication network. Communicating via the wired or wireless connection 126 may allow controller 18 to exchange data with external database 128. As such, external database 128 may be at a location outside of building 102. In some examples, external database 128 may be, include, or otherwise be used in combination with a remote server, cloud computing device, or network of controllers configured to communicate with each other. For example, controller 18 may check with HVAC controllers in nearby buildings through the internet or other city- or wide-area network. In some examples, controller 18 includes a database of expected configurations associated with various geographic locations stored in memory onboard controller 18. Controller 18 may include the onboard database because it is unable to communicate via communication device 119.

In some examples, external database 128 may be, or otherwise be included in, or accessed via, external computing device 123 (e.g., smartphone, mobile phone, tablet computer, personal computer, etc.). For example, controller 18 may communicate via a Wi-Fi network connection with a smartphone device to exchange data with external database 128. By communicating via wired or wireless connection 126, controller 18 may exchange data with external database 128. The exchanged data may allow controller 18 to verify whether the actual configuration of controller 18 is typical, atypical, correct, and/or erroneous for the HVAC system 104 of building 102 based on geographic location.

Checking the determined settings of controller 18 for an irregularity based on geographic location may reduce user-installation errors. Controller 18 may communicate with external database 128 to determine whether the installation of controller 18 includes an error, difference, discrepancy, or irregularity. For example, if a controller installed in Minnesota, where temperatures frequently drop below zero Fahrenheit, operates HVAC system 104 as a cool-only system, controller 18 may determine the user incorrectly installed the controller. By verifying the determined settings based on geographic location, a controller may reduce user-installation errors and reduce the number of service calls, thereby increasing the ease of installation and increasing customer satisfaction.

The techniques of this disclosure may aid a user to install a new controller 18, which may include removing an old controller. The installation process may require connecting a plurality of wires to the field wire connection terminal block. Because of the various possible wiring configurations, installing a new controller 18 can be confusing. Using the geographic location of the controller to verify the wiring configuration of a new controller can detect errors in the wiring of a new controller. Detecting errors can reduce the complexity and confusion of installing a new controller 18.

FIGS. 2A-2D are diagrams illustrating the installation process for an example HVAC controller 18. HVAC controllers may be designed to allow for connecting a plurality of wires to wiring terminals included in the field wire connection terminal block. Including more wiring terminals than the plurality of wires allows for a single controller to operate various HVAC components 106 as part of a variety of possible HVAC systems 104. As a result, different buildings 102 may include a different set of wires for controlling HVAC components 106 included in HVAC system 104. Not every wire shown in the examples in FIGS. 2A-2D must be included in a given wiring setup, and additional wires may be included. The techniques of this disclosure are suitable for various sets of possible wiring configurations for controller 18 and/or HVAC system 104.

Figure 2A:
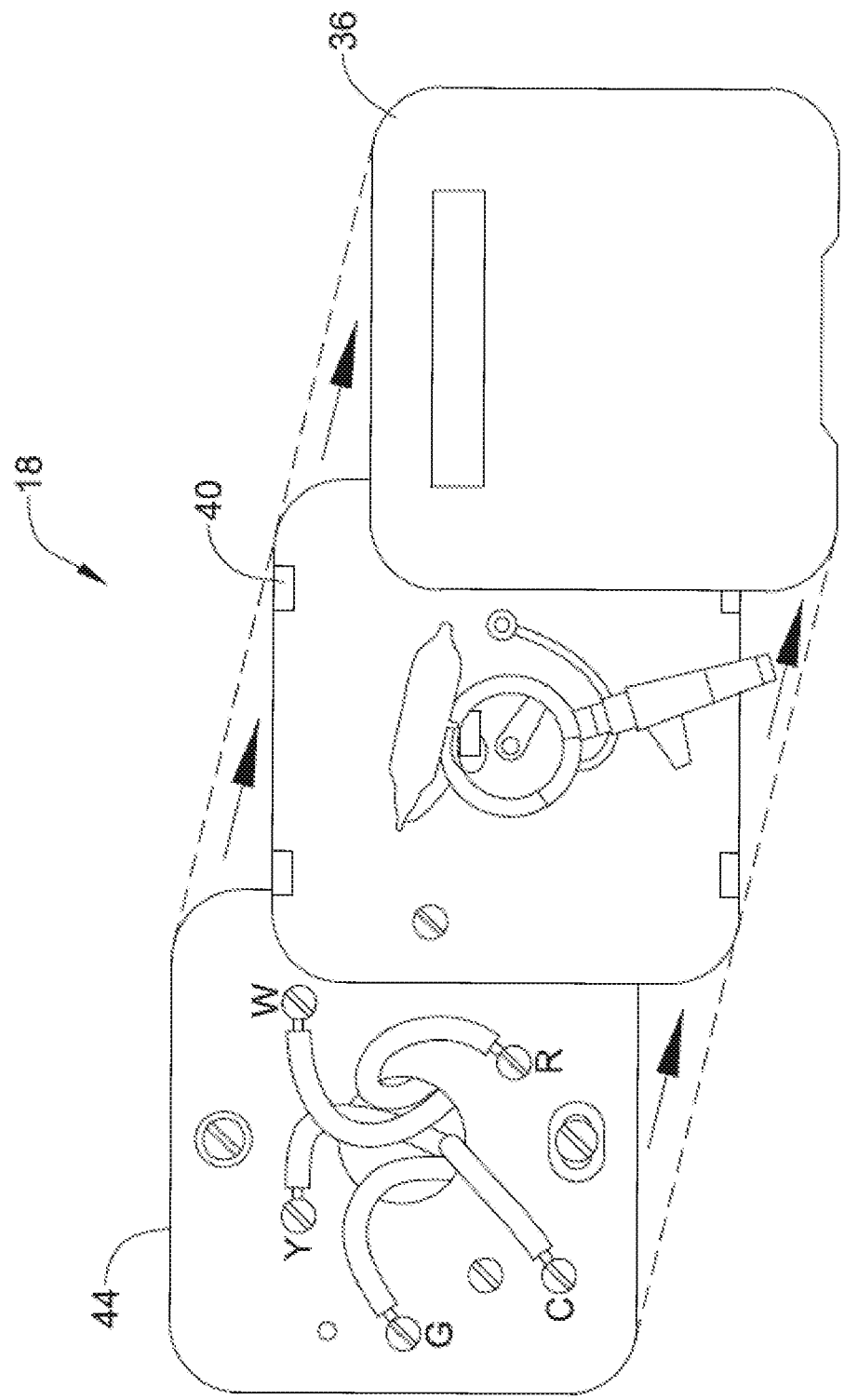
FIGS. 2A-2D are diagrams illustrating the installation process for an example HVAC controller.
Figure 2B:
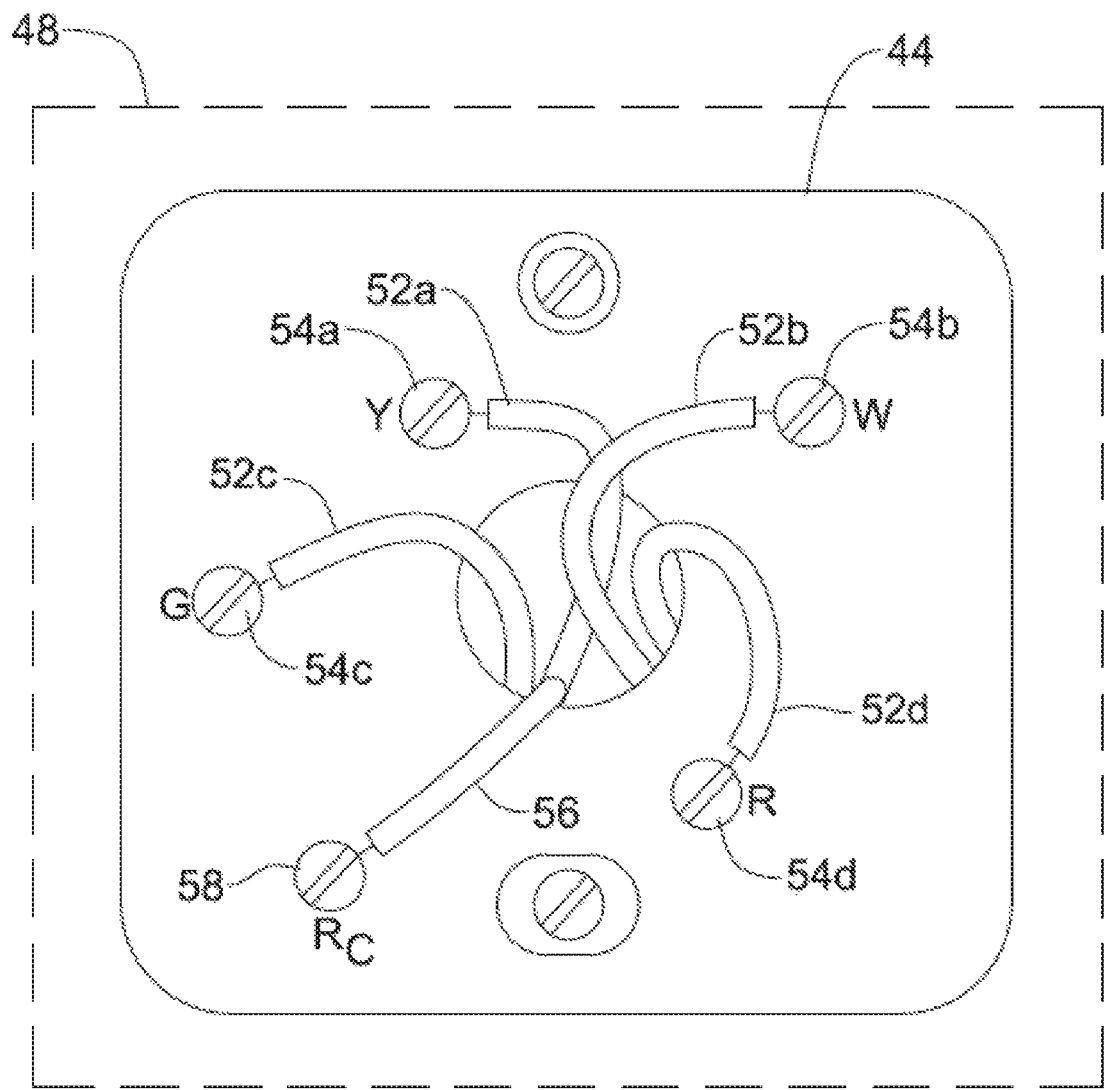

As discussed, the techniques of this disclosure may aid a user to install a new controller 18, which may include removing an old controller. In the example shown in FIG. 2A, to install a new controller 18, a user may first remove the housing cover 36 from controller 18. Then, the user may remove controller housing 40 to expose wall plate 44 attached to the wall of building 102 in which controller 18 is installed. FIG. 2B shows the wall plate 44 mounted to the wall 48 of building 102. As shown in FIG. 2B, a plurality of wires 52a-52d extend out of wall 48 and through an opening provided in wall plate 44. The one or more wires 52a-52d extend from and are in electrical communication with the one or more HVAC components 106 of HVAC system 104 servicing building 102. The number of wires available for connection to controller 18 may depend on the number and type of HVAC components 106 incorporated into HVAC system 104 and/or the previous controller being replaced. Each wire 52a-52d may be connected to an appropriate wire terminal 54a-54d on the wall plate 44, often in a one-to-one manner, such that they are capable of carrying signals from controller 18 to the appropriate HVAC component 106 via the wired or wireless communication network 120. In some cases, wires 52a-52d may provide one-way or bi-directional communication between controller 18 and HVAC system 104.

As shown in FIG. 2B, each of the wire terminals 54a-54d may be labeled with a standard wire terminal label as will be generally recognized by those of skill in the art. In this example, wire terminals 54a-54d are labeled Y (e.g. cooling), W (e.g. heat), G (e.g. fan), and R (24 VAC power to be switched), respectively. These wires may be color coded, such that the Y wire is Yellow, the W wire is White, the G wire is Green, and the R wire is Red.

Figure 2C:
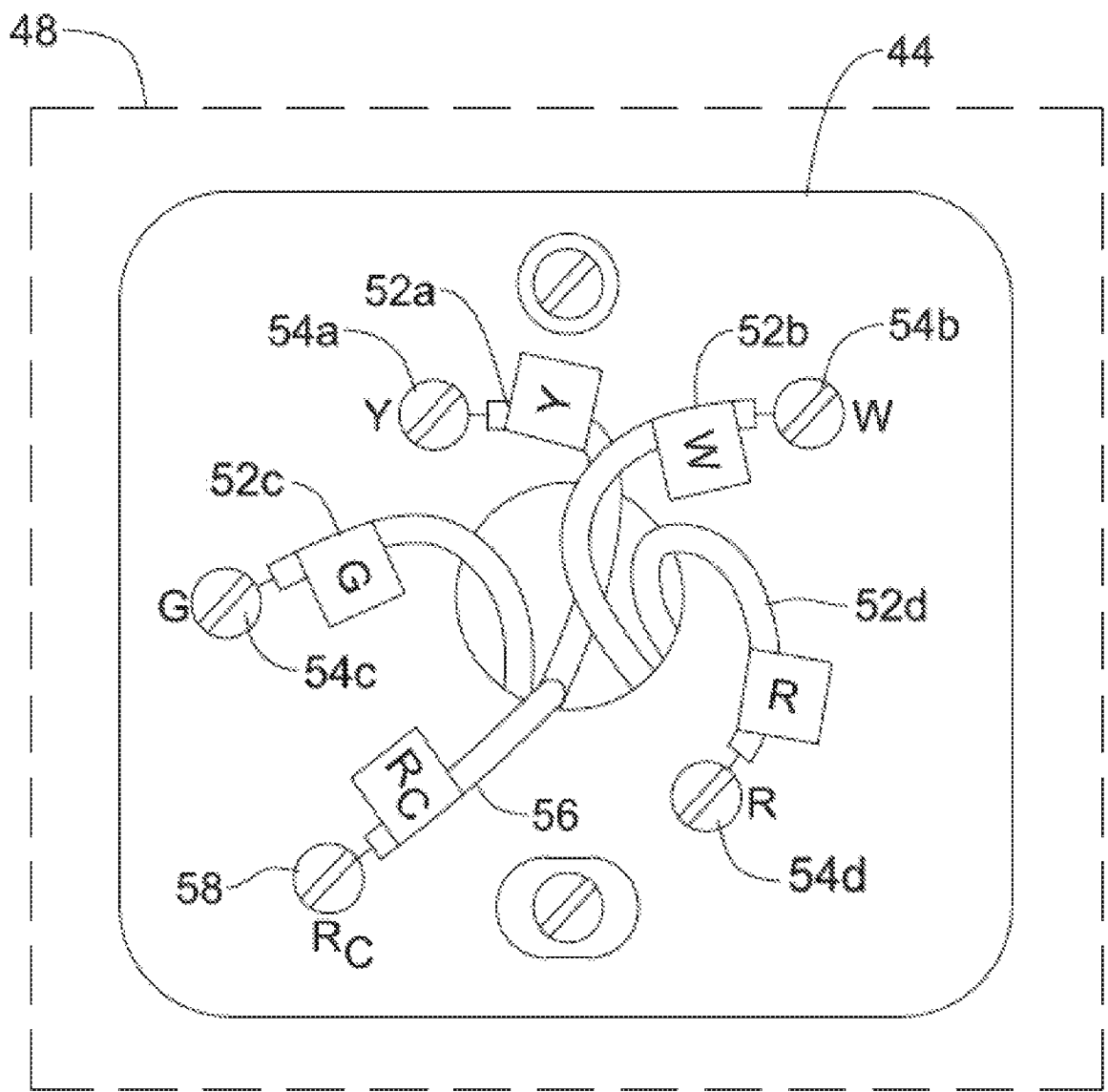
Figure 2D:
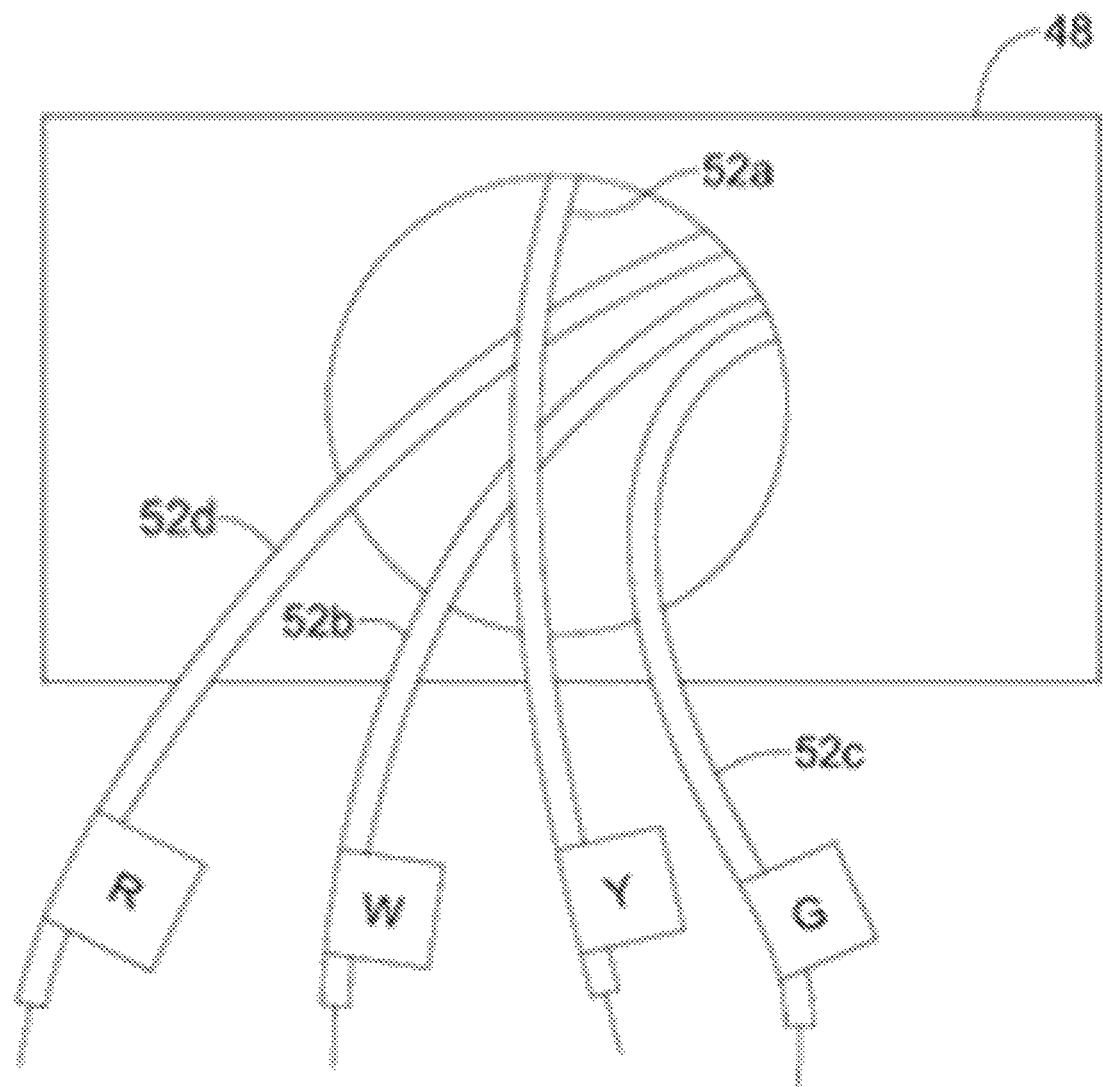

In some examples, as shown in FIG. 2B, an additional wire 56 may be connected to an additional wire terminal 58 labeled Rc (e.g. 24 VAC Cooling call switch power). In such examples, wire terminal 54d may be labeled Rh (e.g. 24 VAC Heating call switch power). Designating wire terminals 58 and 54d in such a way may signify that HVAC system 104 is a dual transformer type system with separate power connections for the heating and cooling system respectively. To aid in installing a new controller 18, a user may label the plurality of wires 52a-52d as shown in FIG. 2C. Labeling the plurality of wires with the wire terminal designations may facilitate identification of an appropriate wiring configuration for the replacement HVAC controller 18. This may aid a user in installing new controller 18. However, controller 18 may still be susceptible to user installation errors if, for example, the user incorrectly connects the plurality of wires to the field wire connection terminal block. FIG. 2D is a schematic view of the wires 52a-52d after removal of the wall plate 44 from the wall 48. As shown in FIG. 2D, the wires 52a-52d have been labeled with the appropriate wire terminal labels 54a-54d, respectively.

Figure 3:
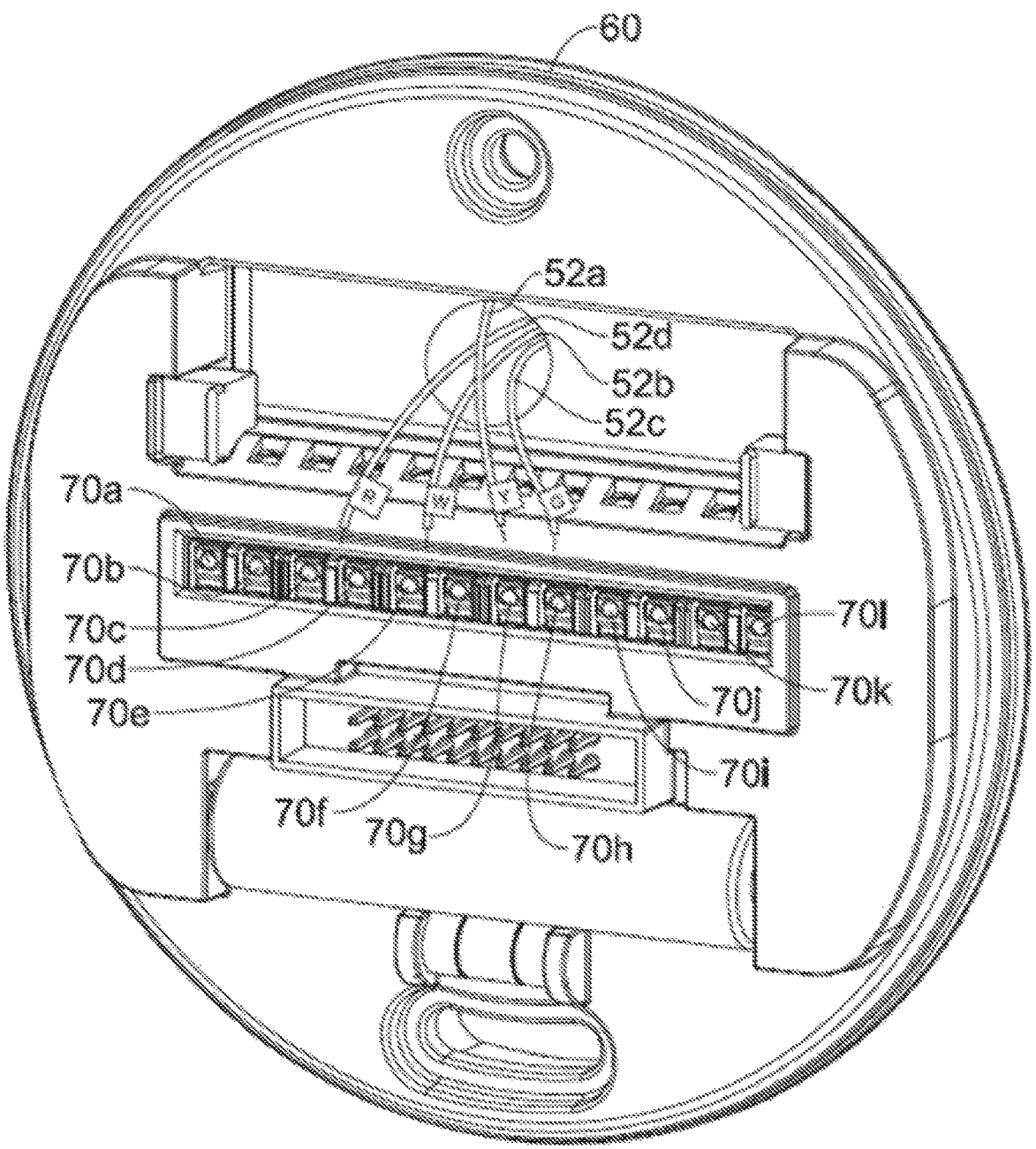
FIG. 3 is an illustration of a wall plate of a replacement HVAC controller mounted on a wall, with the wires of the HVAC system ready to be wired in accordance with a new wiring configuration.

Next, as shown in FIG. 3, the user may place a wall plate 60 of the replacement controller 18 over the wires 52a-52d extending out of the wall 48 such that they may be connected to one or more wire terminals 70a-70l of the field wire connection terminal block provided on the new wall plate 60. The wire terminals 70a-70l of the wire connection terminal block may be labeled (not shown) with wire terminal labels generally known to those skill in the art, but this is not required. An exemplary, non-limiting list of commonly used wire terminal labels and their corresponding description is provided below in Table 1 below. The wiring terminal labels listed in Table 1 are just some examples. In some cases, different manufacturers may utilize different wiring terminal designations for different equipment types.

TABLE 1

Wiring Terminal Labels

| Terminal Code | Description |
| --- | --- |
| 1 | Special communication terminal |
| 2 | Special communication terminal |
| 3 | Special communication terminal |
| 4 | Special communication terminal or 24 Vac Power or heat on power-open/power-close hot water valves (W) |
| 5 | Power on power-open/power-close hot water valves (R) |
| 6 | End call for heat on power-open/power-close hot water valves (Y) |
| AUX | Back up heat for heat pump |
| B | Heat pump reversing valve in heat or 24 Vac common wire |
| C | 24 volt neutral (also referred to as the common wire) |
| Dehum | Dehumidification |
| E | Emergency heat relay on a heat pump |
| F | Fan |
| G | Fan |
| Hum | Humidifier |
| L | Heat pump monitor |
| L1 | Line Power - 120/240 volts |
| L2 | Line Power - 120/240 volts |
| M | Compressor - first stage cooling |
| O | Heat Pump Reversing valve in cooling |
| R | 24 VAC power to be switched |
| Rc | 24 VAC cooling call switch power |
| Rh | 24 VAC heating call switch power |
| S1 | Sensor terminal |
| S2 | Sensor terminal |
| T1 | Sensor terminal |
| T2 | Sensor terminal |
| V | 24 VAC power to be switched |
| Vent | Ventilation equipment |
| W | First stage heating |
| W1 | First stage heat or auxiliary heat |
| W2 | Second stage heat or auxiliary heat |
| W3 | Third stage heat or auxiliary heat |
| X | Emergency Heat or 24 Vac Common |
| X2 | Emergency heat or indicator lights on some thermostats |
| Y | First stage cooling/compressor |
| Y2 | First stage cooling/compressor |

The number and/or type of wire terminals available for connection in the field wire connection terminal block of controller 18 may be dependent upon the make and/or model of replacement controller 18 and the number and/or type of HVAC components 106 that replacement controller 18 is intended to control. As previously noted, there may be multiple thermostat wiring configurations for different HVAC system 104 types which may make installing a replacement HVAC controller 18 confusing for some users. Controller 18 can determine that a heat pump is connected to the terminal block by determining a specific wiring configuration such as a wire that is connected to a terminal with the terminal code O/B. Similarly, controller 18 can determine that a two-stage furnace is connected to terminals with the terminal codes W1 and W2. Controller 18 and/or external computing device 123 can determine an actual configuration of HVAC system 104 by determining which of wire terminals 70a-701 have wires connected. In some examples, controller 18 also determines an actual configuration by asking a user which wires the user have already been connected.

Figure 4:
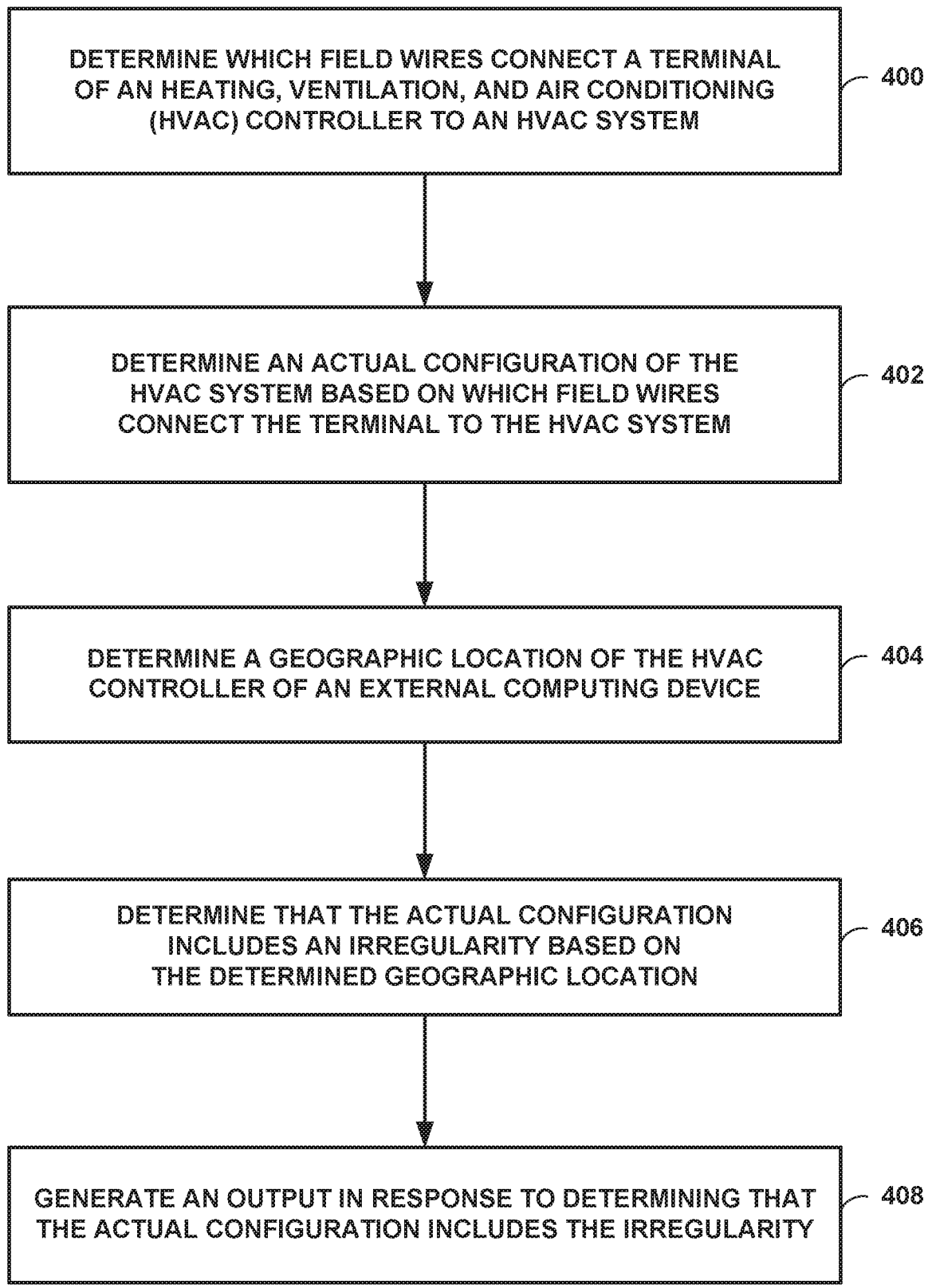
FIG. 4 is a flowchart illustrating an example process for determining an irregularity in a wiring configuration for an HVAC controller based on geographic location.

FIG. 4 is a flowchart illustrating an example process for determining an irregularity in a wiring configuration for an HVAC controller 18 based on geographic location. This example process may aid a user in installing a new controller by determining if the actual configuration of controller 18 is different from an expected controller configuration associated with that geographic location. The techniques of FIG. 4 are described with reference to controller 18 shown in FIG. 1, but other components may exemplify similar techniques. Although the techniques of FIG. 4 are generally described with respect to controller 18, external computing device 123 may perform the techniques in addition to or as the alternative to controller 18.

In the example of FIG. 4, controller 18 or external computing device 123 can determine which field wires connect a terminal of controller 18 to HVAC system 104 (400). As described previously, when installing controller 18, a user may connect a plurality of field wires to control one or more HVAC components 106. For example, a user may connect the R, W, Y, and G wires, as shown in FIG. 3. Controller 18 may detect which field wires are connected to the field wire connection terminal block in multiple ways. In some examples, controller 18 may electrically sense whether one of the plurality of wires 52a-52d is connected to one of the terminals 70a-701 (shown in FIG. 3). For example, controller 18 may test the impedance of a terminal to determine whether a wire is connected to the terminal. In some examples, controller 18 may mechanically sense whether one of the plurality of wires 52-52d is connected to one of the terminals 70a-701. For example, controller 18 may include a sensor that detects the presence of a wire in the terminal.

After determining which field wires connect the terminal to HVAC system 104, controller 18 or external computing device 123 may determine an actual configuration for the HVAC system 104 (402). The actual configuration of the HVAC system 104 may include what HVAC components 106 are housed in building 102, and/or the wiring configuration of HVAC system 104. For example, the actual configuration may include whether HVAC system 104 includes a single or two stage furnace, whether it is a single or dual transformer system, whether it includes a heat pump, an air conditioner, etc. By detecting the plurality of wires connected to the field wire connection terminal block, controller 18 may configure settings for operating HVAC components 106 to properly control the climate conditions of building 102. For example, if controller 18 determines the actual configuration includes an air conditioner and forced air furnace, controller 18 may configure settings which allow both heating and cooling call signals to HVAC system 104.

Controller 18 or external computing device 123 may determine a geographic location of controller 18 (404). The geographic location is generally an area with similar characteristics. The geographic location may comprise a grouping of buildings (e.g., neighborhood), a city or town, state or province, latitude and/or longitude, climate region, topographic region, and the like. Additionally or alternatively, the geographic location may be characterized by the average daily mean, minimum, and/or maximum temperature in the hottest and/or coldest month. Controller 18 may determine the geographic location of the controller in a variety of ways. Controller 18 may use included components to determine the geographic location. In some examples, controller 18 may include a Global Navigation Satellite System (GNSS) sensor which determines the latitude and longitude of controller 18. From the determined latitude and longitude, controller 18 may determine its geographic location.

In some examples, as described previously with respect to FIG. 1, controller 18 may communicate with external computing device 123 to determine the geographic location of the controller. Communication device 119 of controller 18 may communicate with a smartphone which includes a GNSS sensor. The smartphone may exchange data with controller 18 which includes the latitude and longitude of the smartphone device. The smartphone may communicate this information through a wireless network such as the internet, Bluetooth, Zigbee, or near-field communication. Based on the latitude and longitude of the smartphone device, controller 18 may determine the geographic location of the controller.

In some examples, communication device 119 of controller 18 allows controller 18 to connect to a network using an IP address. Controller 18 may then determine the geographic location of the controller based on the IP address of the controller. Alternatively or additionally, controller 18 may exchange data with external computing device 123 which includes the IP address of external computing device 123. Controller 18 may then determine the geographic location of the controller or of external computing device 123 based on the IP address of external computing device 123. External computing device 123 can also determine the geographic location of controller 18 and query external database 128 for an expected configuration associated with the geographic location.

In some examples, controller 18 may determine the geographic location via user input. For example, controller 18 may query the user via the included display to input the geographic location (e.g., postal address, city, state, etc.) of building 102. In some examples, controller 18 may query the user to verify the information during an online registration process. In some examples, controller 18 may determine the geographic location of the controller based on an online registration process of the new controller 18. The user may complete this online registration process on external computing device 123 or via the user interface of controller 18, which may include a display. For example, the user can complete the online registration process for controller 18 (e.g., to register controller 18 with the manufacturer and/or servicer) using a cell phone or tablet that is connected to controller 18 through a wireless network. The online registration process may be used to set up controller 18 after installation (e.g., register for warranty purposes, to access an owner's manual, etc.). The online registration process may require the user to enter an address, postal code, telephone code, city, state, and/or province of building 102. Controller 18 may receive the registered geographic location from external computing device 128, and/or controller 18 may determine the location based on user input.

The geographic location of controller 18 (i.e., building 102) determined by controller 18 may be described and/or stored in a variety of ways. In some examples, the geographic location of controller 18 includes an address. The address may include, be, or otherwise be used in combination with, postal code (e.g., zip code), street address, latitude and longitude coordinates, city or town, state or province, telephone code (e.g., area code). In some examples, the geographic location includes a general climate of the region where building 102 is located. The climate may include, be, or be used in combination with, an average annual temperature of the location of building 102, an average monthly temperature of the location of building 102, an average extreme minimum temperature and/or an average extreme maximum temperature of the location of building 102, an annual temperature range of the location of building 102, a topographic region and the like. Controller 18 may use the address, and/or general climate conditions of building 102 to determine the geographic location of controller 18. The described examples of geographic location should not be taken as limiting, as the geographic location of controller 18 can be described in a variety of ways, a subset of which have been described by this disclosure.

Controller 18 or external computing device 123 can use the determined geographic location to determine whether the actual configuration of controller 18 includes an irregularity (406). External database 128 may store data which includes how previously installed controllers were configured. Controller 18 may query external database 128, communicate the determined geographic location of the controller, then receive data from external database 128 which details an expected configuration of controller 18 associated with that geographic location. If controller 18 determines the actual configuration does not match the expected configuration, controller 18 may determine the actual configuration includes an irregularity. For example, if controller 18 determines that the actual configuration of the controller does not include an air conditioner and determines that the geographic location of the controller is Austin, Tex., controller 18 may determine that the actual configuration is atypical. External database 128 may include data of previously configured controllers in Austin with actual configurations which included an air conditioner. Since the actual configuration of the newly installed controller 18 does not match the data set of previously configured controllers in Austin, controller 18 may determine there is an irregularity in the actual configuration. In other words, controller 18 may determine there is a difference between the actual configuration and the expected configuration based on data stored on external database 128. During the installation process, the user may have incorrectly connected one or more of the plurality of wires to the terminals of the field wire connection terminal block, may have forgotten to connect one or more wires, and/or otherwise incorrectly configured controller 18.

In some examples, controller 18 determines whether the actual configuration of controller 18 includes an irregularity by receiving an expected configuration from external database 128. Controller 18 may transmit its geographic location to external database 128, then receive an expected configuration associated with its geographic location from external database 128. Controller 18 may then determine whether the actual configuration is atypical and/or whether there is an error in the actual configuration (e.g., a difference between the actual configuration and the expected configuration). In some examples, controller 18 may transmit both its geographic location and actual configuration to external database 128. External database 128 may determine the expected configuration associated with the geographic location and then determine whether there is an irregularity in the actual configuration of controller 18 (e.g., a difference between the actual configuration and the expected configuration). Additionally or alternatively, controller 18 may include a local database stored in a memory onboard controller 18, where the local database includes associations between geographic locations and expected configurations. In examples in which controller 18 includes a local database, controller 18 may perform the techniques of this disclosure without communicating with external database 128.

Controller 18 and/or external database 128 may be configured to determine that the actual configuration is atypical by comparing the actual configuration to an expected configuration. An actual configuration may be atypical if there is a difference or discrepancy between the actual and expected configurations. Controller 18 and/or external database 128 can determine the severity of the difference and then determine an output based on the severity. For example, an HVAC system with no furnace in South Carolina may be irregular but not an outright error. In response, controller 18 can output a message querying the user to confirm the actual configuration. In contrast, an HVAC system with no furnace in Pennsylvania is an outright error, and controller 18 may be configured to output an alert to the user that a furnace should be connected.

Controller 18 can generate an output in response to determining that the actual configuration of controller 18 includes the irregularity (408). Controller 18 can generate an output in a variety of ways. In some examples, controller 18 generates the output to the user via the included user interface. For example, controller 18 may output a message to check and verify the connection of the plurality of wires (52*a*-52*d* and 56 as shown in FIG. 3). In some examples, controller 18 generates an output to external computing device 123. Controller 18 may transmit data to external computing device 123 which generates an output. External computing device 123 may then output a notification via an included user interface, generate an email, text message, automated call, or other output for a user to view or otherwise acknowledge.

In some examples, controller 18 generates the output to the included user interface or to external computing device 123 as a notification. The notification may include an alert message. The alert message may include any combination of text and/or symbols which convey to the user that the actual configuration of controller 18 includes an irregularity. For example, if controller 18, located in Austin, Tex. determines an air conditioner is not connected to it, it may output the following message: "No air conditioner is connected. Are you sure you do not want to connect an air conditioner?" Such an example notification may alert the user that controller 18 was installed improperly. In some examples, the alert message may include a code for the user to reference which represents the difference between the actual configuration of controller 18 and the expected configuration based on the geographic location.

In some examples, controller 18 generates an output as an audible alert. Controller 18 may output a beeping tone, a verbal warning, or otherwise communicate to the user that the actual configuration includes an irregularity. In some examples, controller 18 generates an output as a visual alert. Controller 18 may flash a backlight of the user interface, flash an included light of controller 18, or otherwise visually indicate that the actual configuration of controller 18 is atypical (e.g., includes a difference). Controller 18 may use a first color (e.g., yellow) for an atypical configuration that is not an explicit error and a second color (e.g., red) for an atypical configuration that is an explicit error.

In some examples, controller 18 generates an output that includes instructions how to resolve the irregularity. Controller 18 may generate the output via the included user interface. In some examples, controller 18 generates the output to external computing device 123. External computing device 123 may then output information to the user. For example, in the example controller installed in Austin, Tex. without an air conditioner, controller 18 may display via the user interface the wire terminal where the air conditioning wire (e.g., Y wire) should be connected to the field wire connection terminal block. This may reduce user confusion in fixing the irregularity. It may enable a user to more easily wire controller 18 so that the actual configuration matches the expected configuration for a controller associated with that geographic location. The instructions to fix the irregularity may include a step-by-step guide. For example, external computing device 123 may generate an output which includes how to remove the housing cover (housing cover 36 shown in FIG. 2A) or other components, what wires should be connected and/or removed from which wire terminals, or other information on how to correct the irregularity in the configuration of controller 18.

In some examples, controller 18 may allow a user to override the output in response to determining that the actual configuration includes an error. Controller 18 may allow the override in a variety of ways. In some examples, controller 18 may output the message, notification, tone, or other output to a user for a certain period of time. Upon expiry of the timer, controller 18 may determine the user intends to override the error message output. In some examples, controller 18 may query a user asking if they wish to override the error message. For example, when a user installs controller 18 in their summer cabin in northern Minnesota, which may not include a furnace, heat pump, or other heating HVAC component, controller 18 may determine there is an error in the actual configuration. The expected configuration in Minnesota may include a furnace or other heating HVAC component 106 because the associated geographic location experiences sub-zero Fahrenheit temperatures. The user may override the generated response from controller 18 because the difference between the actual configuration and the expected configuration is intentional. Controller 18, in such examples, may allow the user to configure the HVAC system 104 in a way that is not the expected configuration for a certain geographic location. Thus, controller 18 may determine an irregularity rather than an error because the irregularity may be intentional and desired by the user.

Generating an output in response to determining that the actual configuration of controller 18 includes an irregularity based on the geographic location may reduce the confusion in installing a new controller. In addition to detecting which field wires are connected to the field wire connection terminal block, controller 18 can determine the geographic location of the controller and verify that the actual configuration matches or closely matches an expected configuration of the geographic location. This method may check the actual configuration of the newly installed controller by determining whether there is a difference between the actual configuration and how previously installed controllers in the geographic region have been configured. Users in each particular geographic region may install similar HVAC components 106 as part of HVAC system 104. For example, in the geographic location of Minnesota, United States, previously configured controllers 18 may always include an air conditioner and a furnace because of the temperature extremes that the region experiences. As more controllers are configured in a certain geographic region, a newly installed controller 18 may compare the configuration with a larger dataset. As discussed, previously configured controller data may be stored on external database 128.

Figure 5:
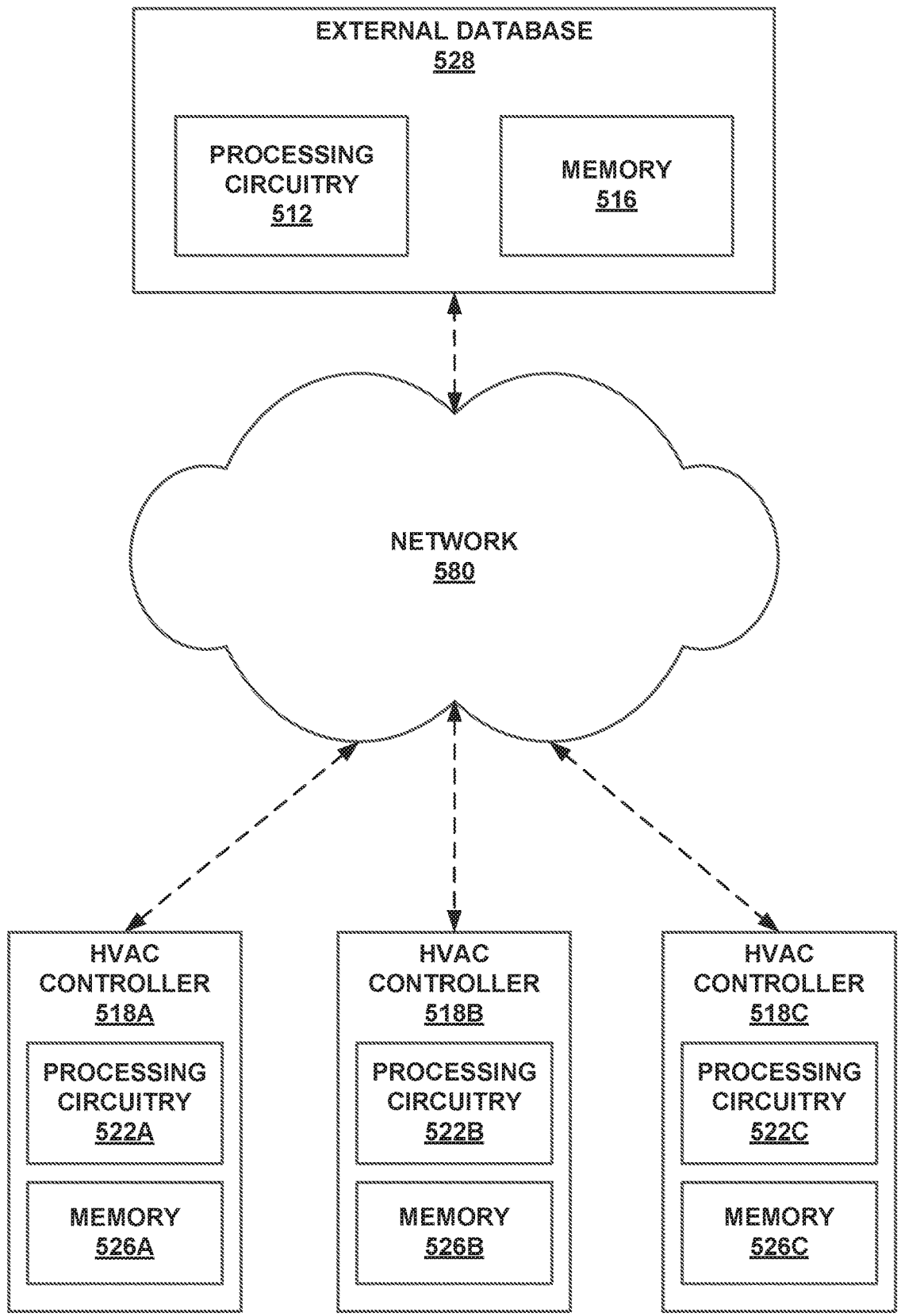
FIG. 5 is a conceptual block diagram illustrating an example system for determining an irregularity in a wiring configuration for an HVAC controller based on geographic location.

FIG. 5 is a conceptual block diagram illustrating an example system for determining an irregularity in a wiring configuration for an HVAC controller 518A-518C based on geographic location. FIG. 5 also illustrates an example system for generating an external database 528 for storing data associated with previously configured controllers 518A-518C. As shown by FIG. 5, HVAC controllers 518A-518C may communicate with external database 528 via a wired or wireless network connection 580. Network 580 allows a newly installed controller to check its configuration based on previously configured controllers 518A-518C. For example, HVAC controllers 518A-518C are examples of controller 18 shown FIG. 1, and external database 528 is an example of external database 128 shown in FIG. 1.

In the example of FIG. 5, a user may install new controller 518A in building 102. Controllers 518B-518C may be previously installed and configured controllers. Controllers 518A-518C, as described by the techniques of this disclosure, may be generally in the same geographic location. As described previously, controller 518A can determine whether the actual configuration includes an irregularity based on its geographic location. After controller 518A is installed, controller 518A may communicate with external database 528 via network 580. As shown in FIG. 5, external database 528 includes processing circuitry 512 and memory 516. When controller 518A communicates via network 580, processing circuitry may process the data transmitted by controller 518A. For example, controller 518A may exchange data with external database 528 including the geographic location of controller 518A and optionally the actual configuration for controller 518A. Processing circuitry 512 may then retrieve data stored in memory 516, such as configurations of previously installed controllers (e.g., previously configured HVAC controllers 518B-518C). Processing circuitry 512 may then communicate via network 580 with controller 518A to transmit the expected configuration (e.g., the configurations of previously configured HVAC controllers 518B-518C). As discussed previously, controller 518A may then determine whether the actual configuration includes an irregularity. Additionally or alternatively, processing circuitry 512 can determine whether the actual configuration is atypical and transmit an indication of whether the actual configuration includes an irregularity to controller 518A.

In some examples, external database 528 stores in memory 516 the configurations of previously installed controllers to determine an expected configuration for a controller installed in a geographic location. As more controllers are installed in different geographic locations, more configurations of previously installed controllers may be stored in memory 516. Memory 516 may store the previously configured data in a format to allow for various geographic locations to include different expected configurations. For example, memory 516 may include an expected configuration of HVAC system 104 for Austin, Tex. which includes only an air conditioner, and an expected configuration for Minneapolis, Minn. which includes a furnace and an air conditioner. Memory 516 may store the data based on geographic location as described previously in FIGS. 1-4. For example, memory 516 may store the data according to climate region, city or town, state or province, and the like.

In some examples, a local database is included in a memory onboard controller 518A. For example, controller 518A may include memory which stores data of the predicted configuration of controllers at various geographic locations. Storing previously installed controller configurations on a local database allows controller 518A to check the actual configuration of controller 518A. As such, external database 528 may store more expected configurations as more controllers 518A-518C are installed in various geographic locations.

In some examples, external database 528 includes expected configurations for newly installed controller 518A using predicted configurations based on geographic location. This may allow a newly installed controller 518A to check the actual configuration even if there are no previously configured controllers 518B-518C in the geographic location. In such an example, memory 516 stores predicted configurations. For example, external database 528 may include data about what HVAC components are predicted to be included in an HVAC system 104 for a particular region (e.g., Minnesota might be predicted to include a furnace and an air conditioner, while Texas might be predicted to only include an air conditioner). In some examples, predicted configurations may be stored in memory 516 as a starting point for external database 528. Setting up the data on external database 528 may include manually configuring the database to include the predicted configurations for the various geographic locations.

In some examples, external database 528 is configured to determine whether the actual configuration of controller 518A includes an irregularity based on the geographic location. Controller 518A may send information including the geographic location to external database 528. With the included processing circuitry 512 (as shown in FIG. 5), external database may determine whether there is a difference between the actual configuration of controller 518A and the expected configuration associated with the geographic location. External database 528 may then communicate with controller 518A that there is an irregularity in the actual configuration. Controller 518A may then generate an output in response.

Additionally or alternatively, controller 518A may be configured to determine an expected configuration for the geographic location by communicating with other controllers in the geographic location via network 580. The other controllers may send actual configurations to controller 518A through network 580. Controller 518A may aggregate the received configurations and determine an expected configuration based on, for example, the most commonly received configuration.

Figure 6:
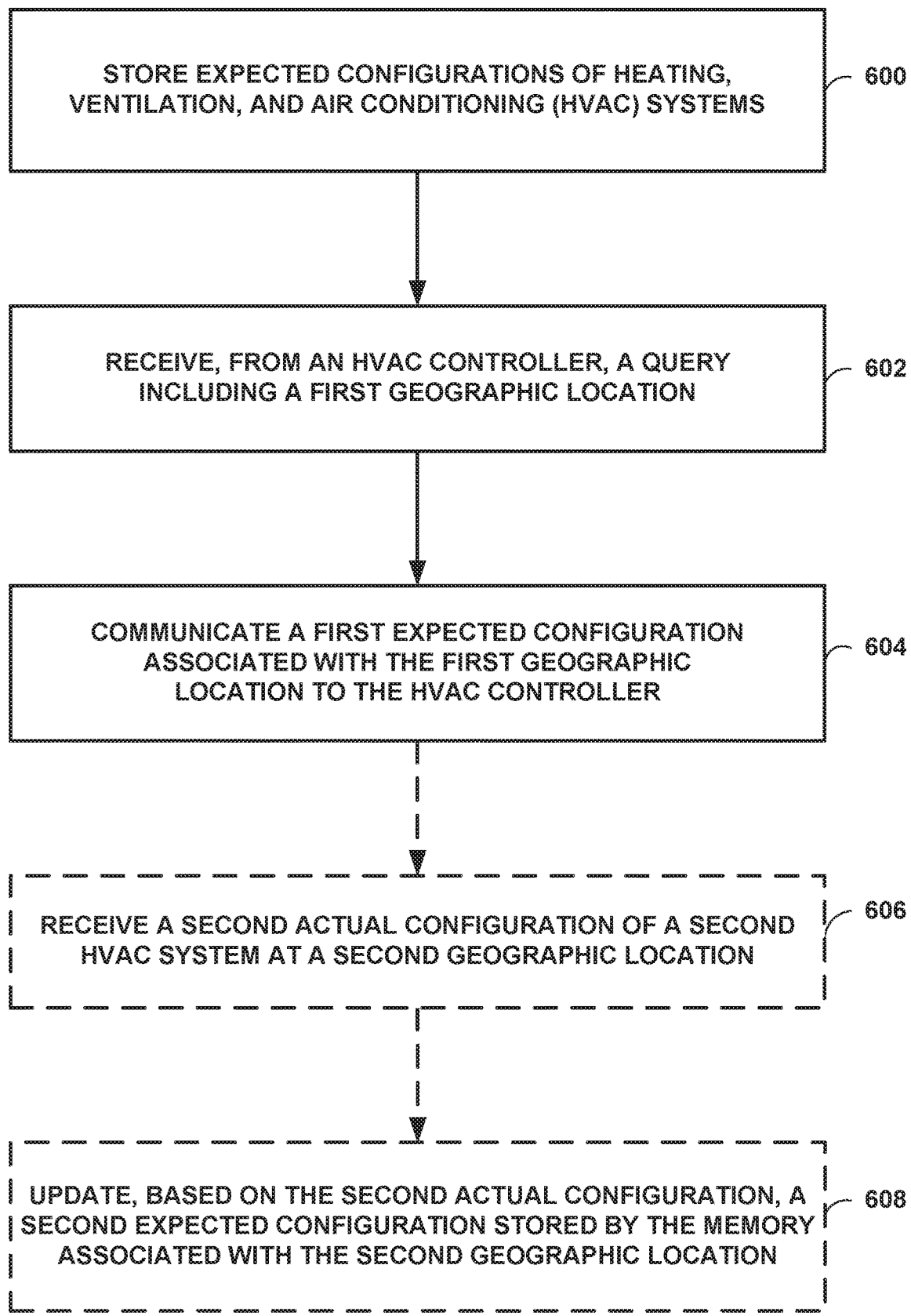
FIG. 6 is a flowchart illustrating an example process for operating a database of expected configurations of HVAC systems.

FIG. 6 is a flowchart illustrating an example process for operating a database of expected configurations of HVAC systems. The techniques of FIG. 6 are described with reference to external database 128 shown in FIG. 1, but other components such as external database 528 shown in FIG. 5 may exemplify similar techniques.

In the example of FIG. 6, external database 128 can store expected configurations based on aggregations of previously installed HVAC systems 104 in particular geographic locations (600). The expected configurations may include data such as the geographic location of the expected configuration, the types of HVAC components 106 included in HVAC system 104, or other information stored about a previously configured HVAC system 104. As previously described, the expected configuration for a geographic location may also include a predicted configuration. The predicted configuration data may include predictions of what HVAC systems a certain geographic location might be.

In the example of FIG. 6, external database 128 may receive, from controller 18, a query including a first geographic location (602). Controller 18 may communicate the first geographic location to external database 128 via the wired or wireless communication network 126. External database 128 may, with included processing circuitry, use the received first geographic location to determine where controller 18 is installed and retrieve from an included memory, an expected configuration typical of that geographic location. Controller 18 may then communicate the expected configuration associated with the first geographic location to the newly installed controller 18 (604). As described in FIG. 4, controller 18 may then determine whether there is an irregularity in the actual configuration.

In some examples of FIG. 6, external database 128 may further receive a second actual configuration of a second HVAC system 104 at a second geographic location (606). External database 128 may again retrieve from an included memory, an expected configuration typical of that geographic location. External database 128 may communicate the expected configuration associated with the second geographic location to the second controller 18.

In some examples of FIG. 6, external database 128 may update, based on the second actual configuration, a second expected configuration stored by the memory associated with the second geographic location (608). In this way, external database 128 may continually update an expected configuration for one or more geographic locations. As more controllers 18 are installed and communicate the actual configuration and geographic location of the installation, external database 128 may include more data sets to compare a newly installed controller. This may allow external database 128 to store more accurate and comprehensive expected configurations for various geographic locations. Updating a second expected configuration for controller 18 associated with the geographic location may also allow external database 128 to store expected configurations for geographic locations with increased granularity. For example, when relatively few expected configurations have been stored, external database may use the state or province location to define geographic location.

As more controllers 18 are configured, external database may improve the resolution of geographic location and instead use city or town configuration data. As even more controllers are configured, external database 128 may store expected configurations based on neighborhoods. External database 128 may continually update the expected configuration of controller 18 associated with a geographic location. External database 128 may apply machine learning techniques to determine the expected configuration(s) for each geographic location. In some examples, external database 128 can determine a most common expected configuration, along with one or more less common expected configurations, for each geographic location. This may include redefining a geographic location as more controller configurations are stored, or using different metrics to define geographic location (e.g., using proximity to ocean waters in coastal regions to define geographic location, but using annual temperature range in midland regions).

Figure 7:
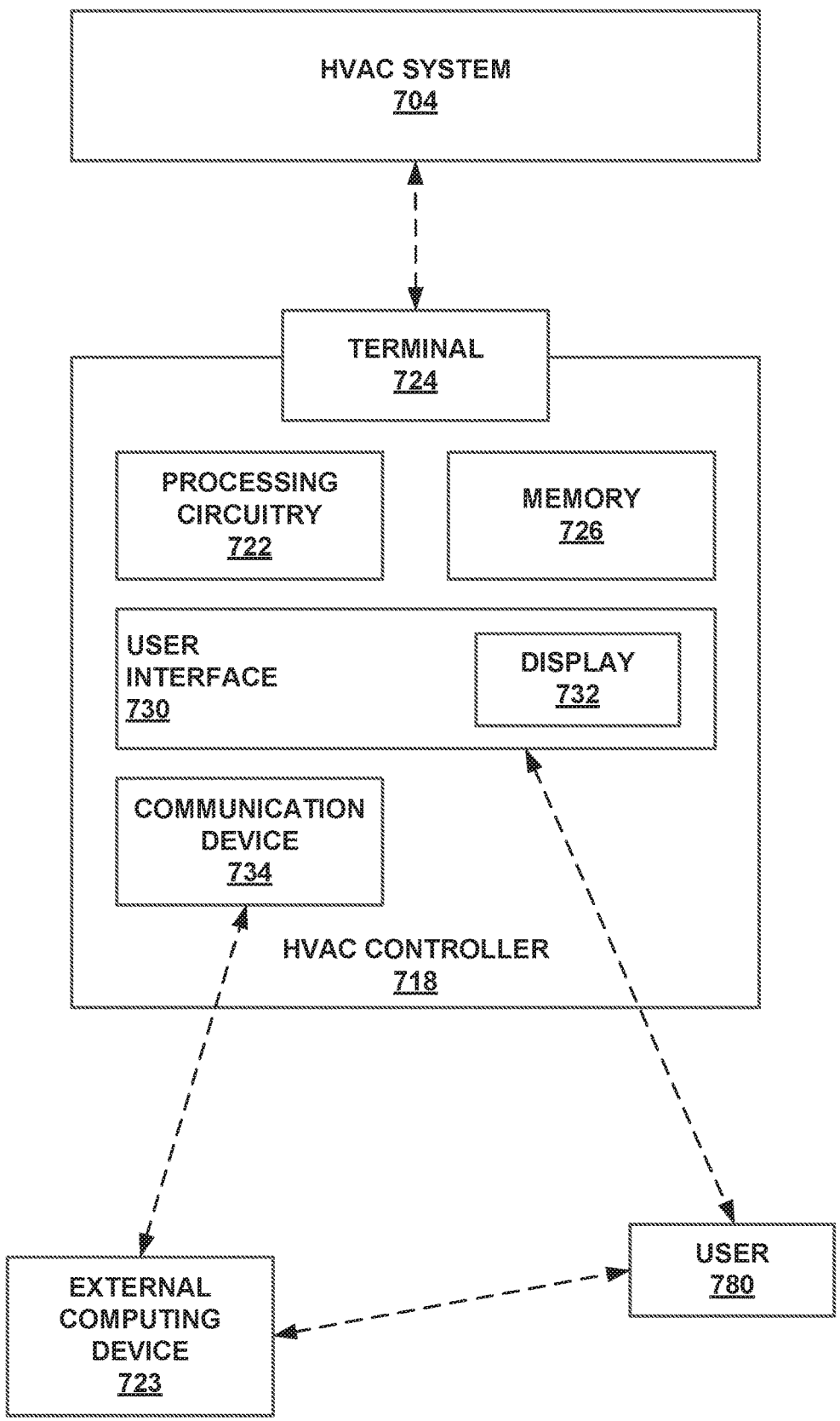
FIG. 7 is a conceptual block diagram illustrating a thermostat operating as an HVAC controller.

FIG. 7 is a conceptual block diagram illustrating a thermostat operating as an HVAC controller 718. In some examples, HVAC controller 718 is a smart thermostat that can control HVAC system 704 and provide user interface 730 for interacting with user 780. As a smart thermostat, HVAC controller 718 may include sufficient processing power to perform the techniques of this disclosure.

HVAC controller 718 includes terminal 724, which can communicate with and control HVAC system 704 through a plurality of field wires. Processing circuitry 722 may be configured to detect the field wires connected to terminal 724 and determine an actual configuration of HVAC system 704 based on the detected field wires. Processing circuitry 722 can then determine whether the actual configuration includes an irregularity based on a geographic location of HVAC controller 718. For example, memory 726 can store an expected configuration for the geographic location, and processing circuitry 722 can compare the actual and expected configurations. Processing circuitry 722 may be configured to cause user interface 730, display 732, and/or external computing device 723 to output an indication of the irregularity to user 780.

In the example shown in FIG. 7, user 780 can control the operation of HVAC system 704 through external computing device 723 or user interface 730. External computing device 723 may be a mobile phone, tablet, or computer that runs an application such as a smart home application. In response to a user input, HVAC controller 718 can issue a command to HVAC system 704 via terminal 724.

Figure 8:
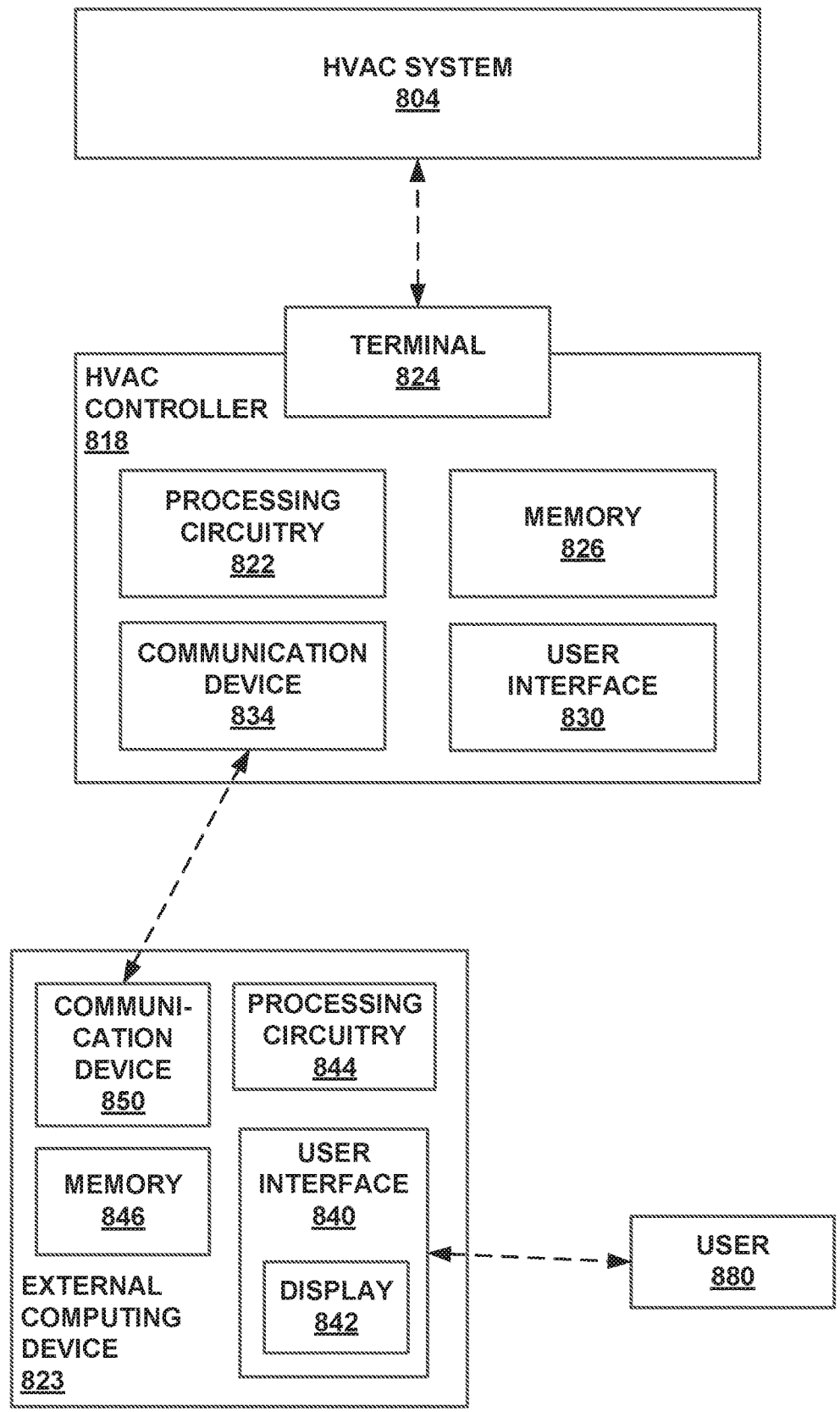
FIG. 8 is a conceptual block diagram illustrating an HVAC controller in communication with an external computing device.

FIG. 8 is a conceptual block diagram illustrating a HVAC controller 818 in communication with an external computing device. In some examples, HVAC controller 818 is an older thermostat that can control HVAC system 804 without a sophisticated user interface and/or without sufficient processing power to perform the techniques of this disclosure. External computing device 823 can perform any of the techniques attributed to controllers in this disclosure, including issuing commands to control HVAC system 804 and determining whether an actual configuration of HVAC system 804 includes an irregularity.

External computing device 823 may be a mobile phone, tablet, or computer that runs an application such as a smart home application. In response to a user input, external computing device 823 can issue a command to HVAC controller 818 via communication devices 834 and 850. HVAC controller 818 can then issue a command to HVAC system 804 via terminal 824. In some examples, external computing device 823 can issue a command directly to HVAC system 804. Thus, user 880 may not interact directly with HVAC controller 818 in order to control HVAC system 804.

Processing circuitry 822 may be configured to detect the field wires connected to terminal 824, and processing circuitry 844 can determine the field wires connected to terminal 824 based on communication with HVAC controller 818. Processing circuitry 844 can determine an actual configuration of HVAC system 804 based on the determined field wires. Processing circuitry 844 can then determine whether the actual configuration includes an irregularity based on a geographic location of external computing device 823 or a geographic location of HVAC controller 818. For example, memory 846 can store an expected configuration for the geographic location, and processing circuitry 844 can compare the actual and expected configurations. Processing circuitry 844 may be configured to cause user interface 840 to output an indication of the irregularity to user 880.

Figure 9:
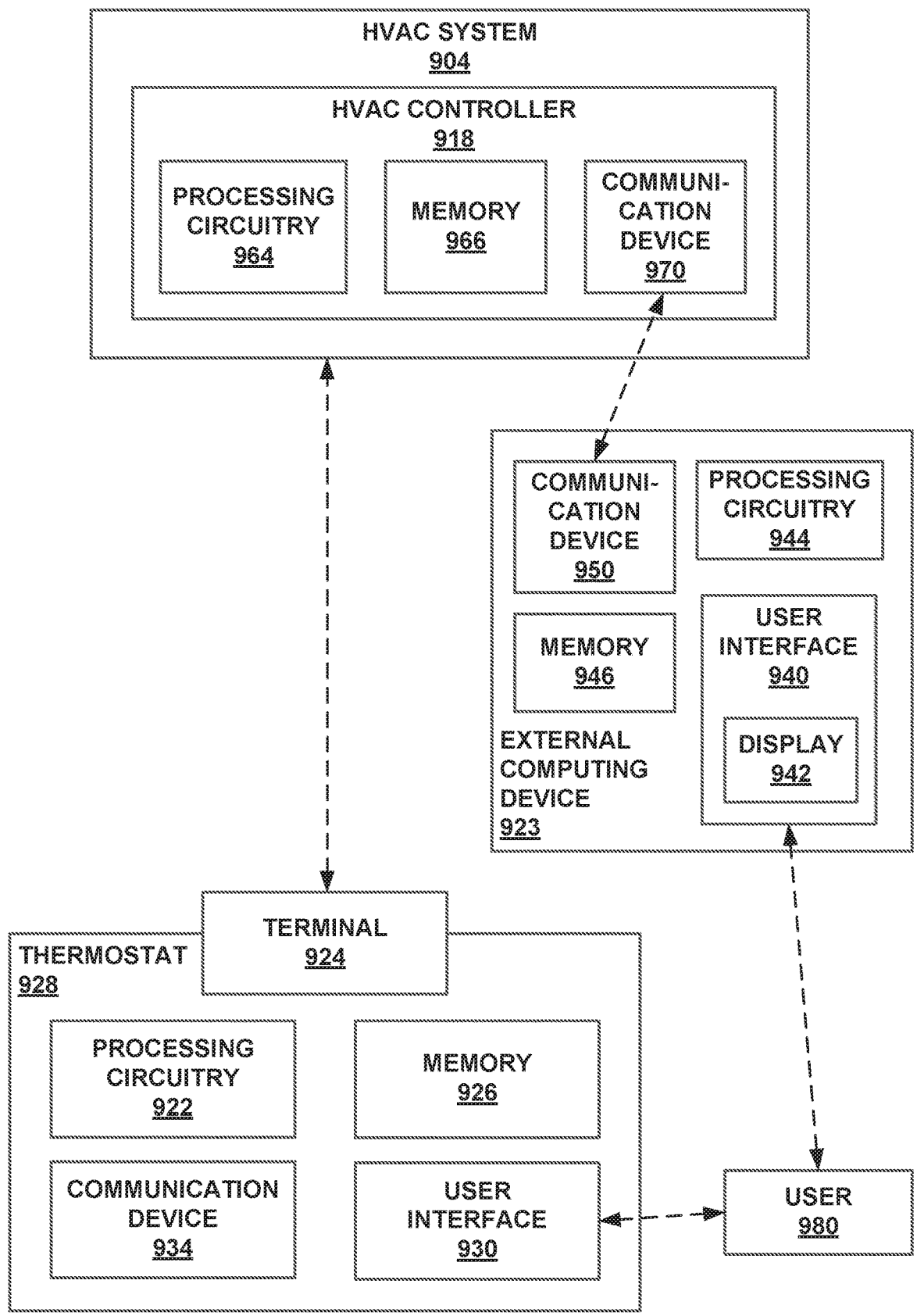
FIG. 9 is a conceptual block diagram illustrating an HVAC controller integrated into an HVAC system.

FIG. 9 is a conceptual block diagram illustrating an HVAC controller 918 integrated into an HVAC system 904. In the example shown in FIG. 9, HVAC controller 918 is built-in to an HVAC component of HVAC system 904, such as a furnace. HVAC controller 918 may or may not include a sophisticated user interface and/or sufficient processing power to perform the techniques of this disclosure. In some examples, user 980 may interact with HVAC controller 918 only through user interface 940 of external computing device 923, and processing circuitry 944 of external computing device 923 may perform the techniques of this disclosure.

User 980 can interact with HVAC controller 918 and control HVAC system 904 through user interface 930 of thermostat 928 or through user interface 940 of external computing device 923. Additionally or alternatively, HVAC controller 918 can include a user interface to allow user 980 to interact with HVAC controller 918 and control HVAC system 904.

Processing circuitry 964 may be configured to detect the field wires connected to terminal 924, and processing circuitry 964 can determine the field wires connected to terminal 824 based on communication with thermostat 928. In some examples, the building may not include thermostat 928 separate from HVAC controller 918, and the field wire connections may be between HVAC controller 918 and HVAC system 904. Processing circuitry 964 can determine an actual configuration of HVAC system 904 based on the determined field wires. Processing circuitry 964 can then determine whether the actual configuration includes an irregularity based on a geographic location of HVAC controller 918, external computing device 923, and/or thermostat 928. For example, memory 966 can store an expected configuration for the geographic location, and processing circuitry 964 can compare the actual and expected configurations. Processing circuitry 964 may be configured to cause user interface 930 and/or user interface 940 to output an indication of the irregularity to user 980. HVAC controller 918 may include a user interface for presenting the indication of the irregularity to user 980.

Although not shown in FIGS. 7-9, HVAC controllers 718, 818, and 918 and/or thermostats 828 and 928 may include a sensor integrated into the thermostat. Communication devices 734, 834, and/or 934 may be configured to communicate with other sensors positioned throughout a building. Each sensor may be able to sense temperature, humidity, motion, occupancy, and/or environmental parameters and to communicate the sensed parameters to HVAC controllers 718, 818, and 918 and/or thermostats 828 and 928. Example details of an HVAC controller in communication with sensors can be found in commonly assigned U.S. patent application Ser. No. 16/422,748, filed on May 24, 2019, entitled "Selecting a Fallback Temperature Sensor for No Occupancy," the entire contents of which is incorporated herein.

The techniques of this disclosure may also be described in the following examples.

Example 1. In some examples, a device can control an HVAC system within a building. The device includes a memory configured to store an actual configuration of the HVAC system and processing circuitry operably coupled to the memory. The processing circuitry is configured to determine which field wires connect a terminal to the HVAC system. The processing circuitry is further configured to determine an actual configuration of the HVAC system based on which field wires connect the terminal to the HVAC system and determine a geographic location of the HVAC controller or of the device. The processing circuitry is configured to determine that the actual configuration includes an irregularity based on the determined geographic location and generate an output in response to determining that the actual configuration includes an irregularity.

Example 2. The device of example 1, wherein the device is the HVAC controller.

Example 3. The device of example 1 or example 2, wherein the device comprises an external computing device configured to communicate with the HVAC controller.

Example 4. The device of examples 1-3 or any combination thereof, wherein the processing circuitry is further configured to connect to a network using an Internet Protocol address.

Example 5. The device of examples 1-4 or any combination thereof, wherein the processing circuitry is configured to determine the geographic location based on the Internet Protocol address.

Example 6. The device of examples 1-5 or any combination thereof, wherein the processing circuitry is configured to determine the geographic location based on information received from a user during an online registration process for the HVAC controller performed by the processing circuitry or by an external computing device.

Example 7. The device of examples 1-6 or any combination thereof, wherein the processing circuitry is further configured to prompt a user to input the geographic location.

Example 8. The device of examples 1-7 or any combination thereof, wherein the processing circuitry is configured to determine the geographic location based on user input received after prompting the user to select the geographic location.

Example 9. The device of examples 1-8 or any combination thereof, wherein the processing circuitry is configured to prompt the user to select the geographic location by prompting the user for a postal code.

Example 10. The device of examples 1-9 or any combination thereof, wherein the processing circuitry is further configured to determine an expected configuration for HVAC systems associated with the determined geographic location by querying an external database.

Example 11. The device of examples 1-10 or any combination thereof, wherein the processing circuitry is configured to determine that the actual configuration includes the irregularity by determining a difference between the actual configuration and the expected configuration.

Example 12. The device of examples 1-11 or any combination thereof, wherein the processing circuitry is further configured to transmit the actual configuration to the external database.

Example 13. The device of examples 1-12 or any combination thereof, wherein the expected configuration comprises whether the HVAC systems in the determined geographic location include a furnace.

Example 14. The device of examples 1-13 or any combination thereof, wherein the expected configuration comprises whether the HVAC systems in the determined geographic location include a heat pump.

Example 15. The device of examples 1-14 or any combination thereof, wherein the expected configuration comprises whether the HVAC systems in the determined geographic location include an air conditioner.

Example 16. The device of examples 1-15 or any combination thereof, wherein the terminal is a terminal block.

Example 17. The device of examples 1-16 or any combination thereof, wherein the processing circuitry is configured to determine the actual configuration by determining that a furnace is connected to a heat terminal on the terminal block.

Example 18. The device of examples 1-17 or any combination thereof, wherein the processing circuitry is configured to determine that the actual configuration includes the irregularity in response to determining that the furnace is connected to the heat terminal and determining that an expected configuration for HVAC systems in the determined geographic location includes a heat pump.

Example 19. The device of examples 1-18 or any combination thereof, wherein the processing circuitry is configured to determine the actual configuration by determining that a heat pump is connected to a heat terminal on the terminal block.

Example 20. The device of examples 1-19 or any combination thereof, wherein the processing circuitry is configured to determine that the actual configuration includes the irregularity in response to determining that the heat pump is connected to the heat terminal and determining that an expected configuration for HVAC systems in the determined geographic location includes a furnace.

Example 21. The device of examples 1-20 or any combination thereof, wherein the processing circuitry is configured to determine the actual configuration of the HVAC system by determining that an air conditioner is connected to a cool terminal on the terminal block.

Example 22. The device of examples 1-21 or any combination thereof, wherein the processing circuitry is configured to determine that the actual configuration includes the irregularity in response to determining that the air conditioner is connected to the cool terminal and determining that an expected configuration for HVAC systems in the determined geographic location includes no air conditioner.

Example 23. A method for controlling an HVAC system within a building includes determining, by processing circuitry of a device, which field wires connect a terminal on an HVAC controller to the HVAC system. The method includes determining, by the processing circuitry, an actual configuration of the HVAC system based on which field wires connect the terminal to the HVAC system. The method further includes determining, by the processing circuitry, a geographic location of the HVAC controller or of the device and determining, by the processing circuitry, that the actual configuration includes an irregularity based on the determined geographic location. The method includes generating, by the processing circuitry, an output in response to determining that the actual configuration includes the irregularity.

Example 24. The method of example 23, further comprising connecting to a network using an Internet Protocol address.

Example 25. The method of example 23 or example 24, wherein determining the geographic location comprises determining the geographic location based on the Internet Protocol address.

Example 26. The method of examples 23-25 or any combination thereof, further comprising determining the geographic location based on information received from a user during an online registration process for the HVAC controller.

Example 27. The method of examples 23-26 or any combination thereof, further comprising determining an expected configuration for HVAC systems associated with the determined geographic location by querying an external database.

Example 28. The method of examples 23-27 or any combination thereof, wherein determining the actual configuration includes the irregularity comprises determining a difference between the actual configuration and the expected configuration.

Example 29. The method of examples 23-28 or any combination thereof, further including prompt a user to input the geographic location.

Example 30. The method of examples 23-29 or any combination thereof, further including determining the geographic location based on user input received after prompting the user to select the geographic location.

Example 31. The method of examples 23-30 or any combination thereof, further including determining prompt the user to select the geographic location by prompting the user for a postal code.

Example 32. The method of examples 23-31 or any combination thereof, further including determining an expected configuration for HVAC systems associated with the determined geographic location by querying an external database.

Example 33. The method of examples 23-32 or any combination thereof, further including determining that the actual configuration includes the irregularity by determining a difference between the actual configuration and the expected configuration.

Example 34. The method of examples 23-33 or any combination thereof, further including transmitting the actual configuration to the external database.

Example 35. The method of examples 23-34 or any combination thereof, wherein determining the actual configuration comprises determining that a furnace is connected to a heat terminal on the terminal block.

Example 36. The method of examples 23-35 or any combination thereof, wherein determining the actual configuration comprises determining that a heat pump is connected to a heat terminal on the terminal block.

Example 37. The method of examples 23-36 or any combination thereof, wherein determining the actual configuration comprises determining that an air conditioner is connected to a cool terminal on the terminal block.

Example 38. The method of examples 23-37 or any combination thereof, wherein determining that the actual configuration includes the irregularity is in response to determining that the heat pump is connected to the heat terminal and determining that an expected configuration for HVAC systems in the determined geographic location includes a furnace.

Example 39. The method of examples 23-38 or any combination thereof, wherein determining that the actual configuration includes the irregularity is in response to determining that the furnace is connected to the heat terminal and determining that an expected configuration for HVAC systems in the determined geographic location includes a heat pump.

Example 40. The method of examples 23-39 or any combination thereof, wherein determining that the actual configuration includes the irregularity is in response to determining that the air conditioner is connected to the cool terminal and determining that an expected configuration for HVAC systems in the determined geographic location includes no air conditioner.

Example 41. A device includes a computer-readable medium having executable instructions stored thereon, configured to be executable by processing circuitry for causing the processing circuitry to determine which field wires connect a terminal on an HVAC controller to an HVAC system. The instructions are further configured to determine an actual configuration of the HVAC system based on which field wires connect the terminal to the HVAC system. The instructions are also configured to determine a geographic location of the HVAC controller or of the device and determine that the actual configuration includes an irregularity based on the determined geographic location. The instructions are further configured to generate an output in response to determining that the actual configuration includes the irregularity.

Example 42. The device of example 41, where the instructions are configured to cause the processing circuitry is configured to perform the method of examples 23-40 or any combination thereof.

Example 43. A system includes means for determining which field wires connect a terminal on an HVAC controller to an HVAC system. The system also includes means for determining an actual configuration of the HVAC system based on which field wires connect the terminal to the HVAC system. The system further includes means for determining a geographic location of the HVAC controller or of the device and means for determining that the actual configuration includes an irregularity based on the determined geographic location. The system includes means for generating an output in response to determining that the actual configuration includes the irregularity.

Example 44. The system of example 43, further including means for perform the method of examples 23-40 or any combination thereof.

Example 45. A system includes memory configured to store expected configurations of heating, ventilation, and air conditioning (HVAC) systems, wherein each expected configuration is associated with a geographic location of a plurality of geographic locations. The system also includes processing circuitry configured to receive, from an HVAC controller, a query including a first geographic location and communicate a first expected configuration associated with the first geographic location to the HVAC controller.

Example 46. The system of example 45, wherein the processing circuitry is further configured to receive a second actual configuration of a second HVAC system at a second geographic location.

Example 47. The system of example 45 or example 46, wherein the processing circuitry is further configured to update, based on the second actual configuration, a second expected configuration stored by the memory associated with the second geographic location.

Example 48. The system of examples 45-47 or any combination thereof, wherein the processing circuitry is configured to receive the query including the first geographic location and a first actual configuration from the HVAC controller.

Example 49. The system of examples 45-48 or any combination thereof, wherein the processing circuitry is further configured to determine that the first actual configuration includes an irregularity by comparing the first actual configuration to the first expected configuration.

Example 50. The system of examples 45-49 or any combination thereof, wherein the processing circuitry is further configured to communicate an indication that the first actual configuration includes the irregularity in response to determining that the first actual configuration includes the irregularity.

Example 51. A method includes storing expected configurations of heating, ventilation, and air conditioning (HVAC) systems, wherein each expected configuration is associated with a geographic location of a plurality of geographic locations. The method also includes receiving, from an HVAC controller, a query including a first geographic location and communicating a first expected configuration associated with the first geographic location to the HVAC controller.

Example 52. The method of example 51, further including receiving a second actual configuration of a second HVAC system at a second geographic location.

Example 53. The method of example 51 or example 52, further including updating, based on the second actual configuration, a second expected configuration stored by the memory associated with the second geographic location.

Example 54. The method of examples 51-53 or any combination thereof, wherein receiving the query includes the first geographic location and a first actual configuration from the HVAC controller.

Example 55. The method of examples 51-54 or any combination thereof, further including determining that the first actual configuration includes an irregularity by comparing the first actual configuration to the first expected configuration.

Example 56. The method of examples 51-55 or any combination thereof, further including communicating an indication that the first actual configuration includes the irregularity in response to determining that the first actual configuration includes the irregularity.

Various examples of the disclosure have been described. Any combination of the described systems, operations, or functions is contemplated. These and other examples are within the scope of the following claims.

The invention claimed is:

1. A system comprising:
a terminal block comprising a plurality of terminals on a heating, ventilation, and air conditioning (HVAC) controller;
a memory;
first processing circuitry operably coupled to the memory, wherein the first processing circuitry is configured to test an electrical property of the plurality of terminals to electrically sense which terminals of the plurality of terminals are connected via field wires to an HVAC system, communicatively couple the HVAC controller to at least one piece of HVAC equipment, deliver commands from the HVAC controller to the at least one piece of HVAC equipment, and deliver commands to a display device communicatively coupled to the HVAC controller; and
second processing circuitry configured to:
connect to a network using an Internet Protocol address;
determine an actual configuration of the HVAC system based on the terminals that are electrically sensed by the first processing circuitry to be connected to the HVAC system;
determine a geographic location of the HVAC controller;
query, via the network, a database storing HVAC configuration data for a plurality of geographic locations, wherein different locations of the plurality of geographics locations are associated with different predicted configurations;
based on the query, determine a predicted configuration for the geographic location of the HVAC controller;
determine that the actual configuration of the HVAC system includes an irregularity when compared to the predicted configuration for the geographic location of the HVAC controller; and
in response to determining that the actual configuration of the HVAC system includes the irregularity, cause a communicatively coupled display device to output an indication that the HVAC system includes the irregularity, and to output a query for a user to confirm whether to ignore the irregularity.

2. The system of claim 1, wherein the HVAC controller comprises the first processing circuitry and the second processing circuitry.

3. The system of claim 1, wherein:
the HVAC controller comprises the first processing circuitry; and
an external computing device, configured to communicate with the HVAC controller, comprises the second processing circuitry.

4. The system of claim 1, wherein the second processing circuitry is configured to determine the geographic location based on the Internet Protocol address.

5. The system of claim 1, wherein the second processing circuitry is configured to determine the geographic location based on information received from the user during an online registration process for the HVAC controller.

6. The system of claim 1, wherein the second processing circuitry is further configured to prompt the user to input the geographic location, and
wherein the second processing circuitry is configured to determine the geographic location based on user input received after prompting the user to input the geographic location.

7. The system of claim 1, wherein the database comprises an external database, and wherein the HVAC configuration data comprises a plurality of actual configurations associated with locations;
wherein the second processing circuitry is further configured to determine the predicted configuration for the geographic location by querying the external database, and
wherein the second processing circuitry is configured to determine that the actual configuration of the HVAC system includes the irregularity by determining a difference between the actual configuration of the HVAC system and the predicted configuration for the geographic location.

8. The system of claim 7, wherein the second processing circuitry is further configured to transmit the actual configuration of the HVAC system to the external database.

9. The system of claim 1, wherein the predicted configuration comprises:
an indication of whether other HVAC systems in the determined geographic location include a furnace; or
an indication of whether the other HVAC systems in the determined geographic location include a heat pump.

10. The system of claim 1, wherein the second processing circuitry is configured to determine the actual configuration of the HVAC system by determining that a furnace is connected to a heat terminal on the terminal block, and
wherein the second processing circuitry is configured to determine that the actual configuration of the HVAC system includes the irregularity in response to:
determining that the furnace is connected to the heat terminal; and
determining that the predicted configuration for the geographic location includes a heat pump.

11. The system of claim 1, wherein the second processing circuitry is configured to determine the actual configuration of the HVAC system by determining that a heat pump is connected to a heat terminal on the terminal block, and
wherein the second processing circuitry is configured to determine that the actual configuration of the HVAC system includes the irregularity in response to:
determining that the heat pump is connected to the heat terminal, and
determining that the predicted configuration for the geographic location includes a furnace.

12. The system of claim 1, wherein the second processing circuitry is configured to determine the actual configuration of the HVAC system by determining that an air conditioner is connected to a cool terminal on the terminal block, and
wherein the second processing circuitry is configured to determine that the actual configuration of the HVAC system includes the irregularity in response to:

determining that the air conditioner is connected to the cool terminal; and determining that the predicted configuration for the geographic location includes no air conditioner.

13. A method comprising:

electrically testing a plurality of terminals to sense which terminals of the plurality of terminals on a terminal block of a heating, ventilation, and air conditioning (HVAC) controller are connected via field wires to an HVAC system;

connecting to a network using an Internet Protocol address;

determining, by processing circuitry, an actual configuration of the HVAC system based on the terminals that are electrically sensed to be connected to the HVAC system;

determining, by the processing circuitry, a geographic location of the HVAC controller; querying, via the network, a database storing HVAC configuration data for a plurality of geographic locations, wherein different locations of the plurality of geographic locations are associated with different predicted configurations;

based on the query, determining a predicted configuration for the geographic location of the HVAC controller;

determining, by the processing circuitry, that the actual configuration of the HVAC system includes an irregularity when compared to the predicted HVAC configuration for the geographic location of the HVAC controller;

causing, by the processing circuitry and in response to determining that the actual configuration of the HVAC system includes the irregularity, a display device communicatively coupled to the processing circuitry to output an indication that the HVAC system includes the irregularity, and to output a query for a user to confirm whether to ignore the irregularity; and transmitting commands from the HVAC controller, via one or more of the field wires, to a piece of HVAC equipment.

14. The method of claim 13, wherein determining the geographic location comprises determining the geographic location based on the Internet Protocol address.

15. The method of claim 13, further comprising determining the geographic location based on information received from a user during an online registration process for the HVAC controller.

16. The method of claim 13, wherein determining the actual configuration of the HVAC system includes the irregularity comprises determining a difference between the actual configuration of the HVAC system and the predicted configuration for the geographic location.

17. A system comprising:

a system controller including a plurality of controller terminals, wherein the system controller is communicatively coupled via the plurality of controller terminals to a piece of equipment of a heating, ventilation, and air conditioning (HVAC) system;

a memory configured to store building comfort configuration data;

first processing circuitry configured to test an electrical property of the plurality of terminals to electrically sense which terminals of the plurality of controller terminals are connected via field wires to a building comfort system; and second processing circuitry configured to:
 determine an actual configuration of the building comfort system based on the terminals that are electrically sensed by the first processing circuitry to be connected to the building comfort system;
 determine a geographic location of the system controller;
 based on the geographic location and the building comfort configuration data, determine a predicted configuration for the building comfort system from a plurality of different predicted configurations, wherein the plurality of different predicted configurations are associated with a plurality of geographies locations;
 determine that the actual configuration of the building comfort system includes an irregularity when compared to the predicted configuration for the geographic location; and
 in response to determining that the actual configuration of the HVAC system includes the irregularity, cause a communicatively coupled display device to output an indication that the HVAC system includes the irregularity, and to output a query for a user to confirm whether to ignore the irregularity.

18. The system of claim 17, wherein the building comfort system comprises the HVAC system.

19. The system of claim 17, wherein the system controller comprises the first processing circuitry and the second processing circuitry.

20. The system of claim 17, wherein:

the system controller comprises the first processing circuitry; and an external computing device, configured to communicate with the system controller, comprises the second processing circuitry.

* * * * *